(12) United States Patent
Taherzadeh Boroujeni et al.

(10) Patent No.: US 11,582,795 B2
(45) Date of Patent: Feb. 14, 2023

(54) MESSAGE REPETITION FOR RANDOM ACCESS PROCEDURE BASED ON A RANDOM ACCESS PROCEDURE FORMAT

(71) Applicant: QUALCOMM Incorporated, San Diego, CA (US)

(72) Inventors: Mahmoud Taherzadeh Boroujeni, San Diego, CA (US); Tao Luo, San Diego, CA (US); Sony Akkarakaran, Poway, CA (US); Yan Zhou, San Diego, CA (US); Wooseok Nam, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 17/160,156

(22) Filed: Jan. 27, 2021

(65) Prior Publication Data
US 2021/0243801 A1 Aug. 5, 2021

Related U.S. Application Data

(60) Provisional application No. 62/968,828, filed on Jan. 31, 2020.

(51) Int. Cl.
*H04W 4/00* (2018.01)
*H04W 74/00* (2009.01)
*H04W 74/08* (2009.01)
*H04W 56/00* (2009.01)
*H04W 72/0446* (2023.01)
*H04W 72/04* (2023.01)

(52) U.S. Cl.
CPC ....... *H04W 74/008* (2013.01); *H04W 56/001* (2013.01); *H04W 72/042* (2013.01); *H04W 72/0446* (2013.01); *H04W 74/0833* (2013.01)

(58) Field of Classification Search
CPC ............ H04W 74/008; H04W 56/001; H04W 72/042; H04W 72/0446; H04W 74/0833
See application file for complete search history.

(56) References Cited

U.S. PATENT DOCUMENTS

2016/0309475 A1* 10/2016 Wong .................. H04W 72/121
2016/0330633 A1* 11/2016 You ..................... H04J 11/0079
2017/0280481 A1* 9/2017 Stern-Berkowitz .........................
H04W 74/006

(Continued)

*Primary Examiner* — Abdelnabi O Musa
(74) *Attorney, Agent, or Firm* — Holland & Hart LLP

(57) ABSTRACT

Methods, systems, and devices for wireless communications are described. In some systems, a user equipment (UE) may attempt to connect to a base station using a random access procedure. During the random access procedure, the base station may transmit control information and data associated with a random access response (RAR) during an RAR window. The UE may identify a channel quality and may transmit a random access request of a first type to the base station. The base station may receive the random access request and transmit repeating instances of the control information or the data, or both, based on identifying that the random access request is of the first type. The UE may use soft-combining to increase the likelihood of successfully decoding the control information and the data associated with the RAR, and likewise may increase the likelihood of successfully receiving the RAR from the base station.

30 Claims, 21 Drawing Sheets

(56) References Cited

U.S. PATENT DOCUMENTS

| | | | |
|---|---|---|---|
| 2017/0290064 A1* | 10/2017 | Liu | H04W 74/0833 |
| 2017/0303317 A1* | 10/2017 | Islam | H04W 72/12 |
| 2019/0132882 A1* | 5/2019 | Li | H04L 27/2605 |
| 2020/0413451 A1* | 12/2020 | Taherzadeh Boroujeni | H04W 48/10 |

* cited by examiner

Portion 415   Portion 420

Window Length 405 | Window Length 410

400

MESSAGE REPETITION FOR RANDOM ACCESS PROCEDURE BASED ON A RANDOM ACCESS PROCEDURE FORMAT

CROSS REFERENCE

The present Application for Patent claims the benefit of U.S. Provisional Patent Application No. 62/968,828 by TAHERZADEH BOROUJENI et al., entitled "MESSAGE REPETITION FOR RANDOM ACCESS PROCEDURE BASED ON A RANDOM ACCESS PROCEDURE FORMAT," filed Jan. 31, 2020, assigned to the assignee hereof, and expressly incorporated by reference herein.

FIELD OF TECHNOLOGY

The following relates generally to wireless communications and more specifically to message repetition for a random access procedure based on a random access procedure format.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems, such as 4G and 5G systems, may support one or more random access procedures for establishing a connection between a UE and a base station. Examples of random access procedures may include a four-step random access channel (RACH) procedure (4-step RACH procedure) and a two-step random access channel procedure (2-step RACH procedure). As demand for communication efficiency increases, some wireless communications systems, such as 4G and 5G systems, may be unable to support high reliability or low latency random access communications, among other examples.

SUMMARY

The described techniques relate to improved methods, systems, devices, and apparatuses that support message repetition for a random access procedures. Generally, the described techniques provide for a more robust random access procedure between a user equipment (UE) and a base station if a communication link between the UE and the base station is in a low connectivity condition. In some wireless communications systems, a UE may attempt to connect to a base station using a random access procedure and may transmit a random access request to the base station. The UE may transmit the random access request over a physical random access channel (PRACH). In some cases, the PRACH over which the UE transmits the random access request may be associated with a quantity of different formats or associated with different resources (e.g., time and frequency resources). In some examples, the UE may select a PRACH format or a set of resources (e.g., multiple time and frequency resources) associated with a PRACH based on the connectivity condition of the UE and a mapping between the selection and a repetition pattern of control information or data associated with a random access response (RAR). For example, the base station may receive the random access request from the UE, identify the PRACH format or the set of resources associated with the PRACH used to transmit the random access request, and determine to use a repetition pattern for the control information or the data of the RAR based on the PRACH format or the set of resources associated with the PRACH used by the UE.

In some implementations, the base station may configure a time window (e.g., an RAR window or other time duration of a random access procedure with resources configured for the UE to receive an RAR) for communicating the control information and data associated with the RAR based on the PRACH format or the set of resources associated with the PRACH used by the UE to transmit the random access request. For example, the base station may identify the PRACH format or the set of resources associated with the PRACH (which may refer to or otherwise indicate a repetition of the random access request over the set of multiple resources associated with the PRACH) and may configure one or more portions of the time window such that at least one portion of the time window is configured to support the transmission of the control information or the data of the RAR with repetition. During the portion configured for the transmission of the control information or the data of the RAR with repetition, the UE may receive multiple instances of the control information or the data and may combine the multiple transmissions prior to decoding and performing a parity check.

A method of wireless communication at a UE is described. The method may include selecting, based on a quality of a channel between the UE and a base station, a first type of random access request from a set of types of random access request for a random access procedure, transmitting, to the base station, a random access request of the first type of random access request based on the selecting of the first type of random access request, identifying, in a first portion of a time window for communicating an RAR and based on the selecting of the first type of random access request, a set of slots, each configured to provide a different one of instances of at least a portion of the RAR, and receiving the instances of at least the portion of the RAR in the set of slots.

An apparatus for wireless communication at a UE is described. The apparatus may include a processor, memory coupled with the processor, and instructions stored in the memory. The instructions may be executable by the processor to cause the apparatus to select, based on a quality of a channel between the UE and a base station, a first type of random access request from a set of types of random access request for a random access procedure, transmit, to the base station, a random access request of the first type of random access request based on the selecting of the first type of random access request, identify, in a first portion of a time window for communicating an RAR and based on the selecting of the first type of random access request, a set of slots, each configured to provide a different one of instances of at least a portion of the RAR, and receive the instances of at least the portion of the RAR in the set of slots.

Another apparatus for wireless communication at a UE is described. The apparatus may include means for selecting, based on a quality of a channel between the UE and a base station, a first type of random access request from a set of types of random access request for a random access procedure, transmitting, to the base station, a random access request of the first type of random access request based on the selecting of the first type of random access request, identifying, in a first portion of a time window for communicating an RAR and based on the selecting of the first type of random access request, a set of slots, each configured to provide a different one of instances of at least a portion of the RAR, and receiving the instances of at least the portion of the RAR in the set of slots.

A non-transitory computer-readable medium storing code for wireless communication at a UE is described. The code may include instructions executable by a processor to select, based on a quality of a channel between the UE and a base station, a first type of random access request from a set of types of random access request for a random access procedure, transmit, to the base station, a random access request of the first type of random access request based on the selecting of the first type of random access request, identify, in a first portion of a time window for communicating an RAR and based on the selecting of the first type of random access request, a set of slots, each configured to provide a different one of instances of at least a portion of the RAR, and receive the instances of at least the portion of the RAR in the set of slots.

In some examples of the method, apparatuses, and non-transitory computer-readable medium described herein, each of the set of types of random access request is associated with a different repetition pattern for transmitting the random access request.

In some examples of the method, apparatuses, and non-transitory computer-readable medium described herein, the first type of random access request is for transmitting the random access request with repetition and a second type of random access request of the set of types of random access request is for transmitting the random access request without repetition.

In some examples of the method, apparatuses, and non-transitory computer-readable medium described herein, each type of the set of types of random access request may be associated with a different subset of preamble sequences of a set of preamble sequences.

In some examples of the method, apparatuses, and non-transitory computer-readable medium described herein, each type of the set of types of random access request may be a different one of a set of formats of the random access request, where the first type of random access request may be a first format of the set of formats.

In some examples of the method, apparatuses, and non-transitory computer-readable medium described herein, the set of formats of the random access request include a set of different preambles.

In some examples of the method, apparatuses, and non-transitory computer-readable medium described herein, the set of different preambles include at least a first preamble having a first length and a second preamble having a second length different from the first length.

In some examples of the method, apparatuses, and non-transitory computer-readable medium described herein, each type of the set of types of random access request may be associated with a different set of resources of a set of sets of resources.

Some examples of the method, apparatuses, and non-transitory computer-readable medium described herein may further include operations, features, means, or instructions for receiving an indication of the set of types of random access request in one or more of a master information block (MIB), a remaining minimum system information (RMSI), or a combination thereof.

In some examples of the method, apparatuses, and non-transitory computer-readable medium described herein, the selecting of the first type of random access request may include operations, features, means, or instructions for identifying a mapping between the set of types of random access request and a set of repetition patterns for receiving the instances of at least the portion of the RAR in the set of slots, and selecting the first type of random access request to repeatedly receive the instances of at least the portion of the RAR according to a repetition pattern of the set of repetition patterns.

In some examples of the method, apparatuses, and non-transitory computer-readable medium described herein, the mapping indicates a correspondence between the transmitting of the random access request with repetition and the receiving of the instances of at least the portion of the random access response according to the repetition pattern.

Some examples of the method, apparatuses, and non-transitory computer-readable medium described herein may further include operations, features, means, or instructions for receiving an indication of the mapping in one or more of an MIB, an RMSI, or a combination thereof.

In some examples of the method, apparatuses, and non-transitory computer-readable medium described herein, the receiving of the instances may include operations, features, means, or instructions for monitoring, during the first portion of the time window, the set of slots for the instances of at least the portion of the RAR based on identifying that the random access procedure may be operating within the first portion of the time window, combining the instances of at least the portion of the RAR identified from monitoring the set of slots, and decoding the RAR received as part of the random access procedure based on the combining of the instances.

Some examples of the method, apparatuses, and non-transitory computer-readable medium described herein may further include operations, features, means, or instructions for performing a parity check on the combination of the instances, where the decoding of the RAR may be based on the performing of the parity check.

In some examples of the method, apparatuses, and non-transitory computer-readable medium described herein, the instances include control information in a control channel.

In some examples of the method, apparatuses, and non-transitory computer-readable medium described herein, the control channel includes a physical downlink control channel (PDCCH).

In some examples of the method, apparatuses, and non-transitory computer-readable medium described herein, the instances include control information or data in a shared channel.

In some examples of the method, apparatuses, and non-transitory computer-readable medium described herein, the shared channel includes a physical downlink shared channel (PDSCH).

Some examples of the method, apparatuses, and non-transitory computer-readable medium described herein may further include operations, features, means, or instructions for receiving one or more synchronization signal blocks, and determining one or both of a received power or a received quality for the one or more synchronization signal blocks, where the quality of the channel may be based on the one more of the received power or the received quality for the one or more synchronization signal blocks.

Some examples of the method, apparatuses, and non-transitory computer-readable medium described herein may further include operations, features, means, or instructions for determining the quality of the channel associated with a random access channel, comparing the quality of the channel with a quality threshold, and selecting the first type of random access request based on the determined quality satisfying the quality threshold, where the first type of random access request may be associated with a first quantity of repetitions of the instances of at least the portion of the RAR, and a second type of random access request of the set of types of random access request may be associated with a second quantity of repetitions of the instances of at least the portion of the RAR, where the first quantity of repetitions may be less than the second quantity of repetitions of the instances.

Some examples of the method, apparatuses, and non-transitory computer-readable medium described herein may further include operations, features, means, or instructions for determining the quality of the channel associated with a random access channel, comparing the quality of the channel with a quality threshold, and selecting the first type of random access request based on the determined quality failing to satisfy the quality threshold, where the first type of random access request may be associated with a first quantity of repetitions of the instances of at least the portion of the RAR, and a second type of random access request of the set of types of random access request may be associated with a second quantity of repetitions of the instances of at least the portion of the RAR, where the first quantity of repetitions may be greater than the second quantity of repetitions of the instances.

In some examples of the method, apparatuses, and non-transitory computer-readable medium described herein, the first portion of the time window for the communicating of the RAR may be preceded by a second portion of the time window for communicating the RAR, the second portion of the time window configured for providing an instance of at least the portion of the RAR without repetition.

Some examples of the method, apparatuses, and non-transitory computer-readable medium described herein may further include operations, features, means, or instructions for receiving, from the base station, an indication of the first portion of the time window and the second portion of the time window via a bit in a bitfield of an RMSI.

In some examples of the method, apparatuses, and non-transitory computer-readable medium described herein, the instances include similar or identical copies of at least the portion of the RAR.

In some examples of the method, apparatuses, and non-transitory computer-readable medium described herein, the random access request may be a message A (msgA) of the random access procedure, and the RAR may be a message B (msgB) of the random access procedure.

In some examples of the method, apparatuses, and non-transitory computer-readable medium described herein, the random access request may be a message 1 (msg1) of the random access procedure, and the RAR may be a message 2 (msg2) of the random access procedure.

A method of wireless communication at a base station is described. The method may include receiving, from a UE, a random access request of a random access procedure, determining, based on the random access request being a first type of random access request from a set of types of random access request, a repetition pattern for a time window for communicating an RAR, the repetition pattern indicating at least a subset of slots of a set of slots of the time window, the set of slots for repeatedly providing at least a portion of the RAR to the UE, and transmitting the portion of the RAR in each slot of the subset of slots according to the repetition pattern.

An apparatus for wireless communication at a base station is described. The apparatus may include a processor, memory coupled with the processor, and instructions stored in the memory. The instructions may be executable by the processor to cause the apparatus to receive, from a UE, a random access request of a random access procedure, determine, based on the random access request being a first type of random access request from a set of types of random access request, a repetition pattern for a time window for communicating an RAR, the repetition pattern indicating at least a subset of slots of a set of slots of the time window, the set of slots for repeatedly providing at least a portion of the RAR to the UE, and transmit the portion of the RAR in each slot of the subset of slots according to the repetition pattern.

Another apparatus for wireless communication at a base station is described. The apparatus may include means for receiving, from a UE, a random access request of a random access procedure, determining, based on the random access request being a first type of random access request from a set of types of random access request, a repetition pattern for a time window for communicating an RAR, the repetition pattern indicating at least a subset of slots of a set of slots of the time window, the set of slots for repeatedly providing at least a portion of the RAR to the UE, and transmitting the portion of the RAR in each slot of the subset of slots according to the repetition pattern.

A non-transitory computer-readable medium storing code for wireless communication at a base station is described. The code may include instructions executable by a processor to receive, from a UE, a random access request of a random access procedure, determine, based on the random access request being a first type of random access request from a set of types of random access request, a repetition pattern for a time window for communicating an RAR, the repetition pattern indicating at least a subset of slots of a set of slots of the time window, the set of slots for repeatedly providing at least a portion of the RAR to the UE, and transmit the portion of the RAR in each slot of the subset of slots according to the repetition pattern.

In some examples of the method, apparatuses, and non-transitory computer-readable medium described herein, each type of the set of types of random access request is associated with a different repetition pattern for transmitting the random access request, and the first type of random access request is for transmitting the random access request with repetition and a second type of random access request of the set of types of random access request is for transmitting the random access request without repetition.

In some examples of the method, apparatuses, and non-transitory computer-readable medium described herein, each type of the set of types of random access request may be a different one of a set of formats of the random access request, and the first type of random access request may be a first format of the set of formats.

In some examples of the method, apparatuses, and non-transitory computer-readable medium described herein, the set of formats of the random access request include a set of different preambles.

In some examples of the method, apparatuses, and non-transitory computer-readable medium described herein, the set of different preambles include at least a first preamble having a first length and a second preamble having a second length different from the first length.

In some examples of the method, apparatuses, and non-transitory computer-readable medium described herein, each type of the set of types of random access request is associated with a different set of resources of a set of sets of resources.

Some examples of the method, apparatuses, and non-transitory computer-readable medium described herein may further include operations, features, means, or instructions for transmitting, to the UE, an indication of the set of types of random access request via an MIB or an RMSI, or a combination thereof.

In some examples of the method, apparatuses, and non-transitory computer-readable medium described herein, determining the repetition pattern may include operations, features, means, or instructions for identifying a mapping between the set of types of random access request and a set of repetition patterns for receiving instances of at least the portion of the RAR in the subset of slots, and determining the repetition pattern based on the mapping indicating that the first type of random access request corresponds to the repetition pattern.

In some examples of the method, apparatuses, and non-transitory computer-readable medium described herein, the mapping indicates a correspondence between receiving the random access request with repetition and transmitting the instances of at least the portion of the random access response with repetition.

Some examples of the method, apparatuses, and non-transitory computer-readable medium described herein may further include operations, features, means, or instructions for transmitting, to the UE, an indication of the mapping in one or more of an MIB or an RMSI, or a combination thereof.

Some examples of the method, apparatuses, and non-transitory computer-readable medium described herein may further include operations, features, means, or instructions for transmitting the portion of the RAR in at least the subset of slots of the set of slots according to the repetition pattern in a first portion of the time window for the communicating of the RAR.

In some examples of the method, apparatuses, and non-transitory computer-readable medium described herein, the first portion of the time window for the communicating of the RAR may be preceded by a second portion of the time window for communicating the RAR, the second portion of the time window configured for providing an instance of the portion of the RAR without repetition.

Some examples of the method, apparatuses, and non-transitory computer-readable medium described herein may further include operations, features, means, or instructions for transmitting, to the UE, an indication of the first portion of the time window and the second portion of the time window via a bit in a bitfield of an RMSI.

In some examples of the method, apparatuses, and non-transitory computer-readable medium described herein, the portion of the RAR includes control information in a control channel.

In some examples of the method, apparatuses, and non-transitory computer-readable medium described herein, the control channel includes a PDCCH.

In some examples of the method, apparatuses, and non-transitory computer-readable medium described herein, the portion of the RAR includes control information or data in a shared channel.

In some examples of the method, apparatuses, and non-transitory computer-readable medium described herein, the shared channel includes a PDSCH.

In some examples of the method, apparatuses, and non-transitory computer-readable medium described herein, a quantity of repetitions of the portion of the RAR include similar or identical copies of the portion of the RAR.

In some examples of the method, apparatuses, and non-transitory computer-readable medium described herein, the random access request may be a msgA of the random access procedure, and the portion of the RAR may be a msgB of the random access procedure.

In some examples of the method, apparatuses, and non-transitory computer-readable medium described herein, the random access request may be a msg1 of the random access procedure, and the portion of the RAR may be a msg2 of the random access procedure.

DETAILED DESCRIPTION

Figure 1:
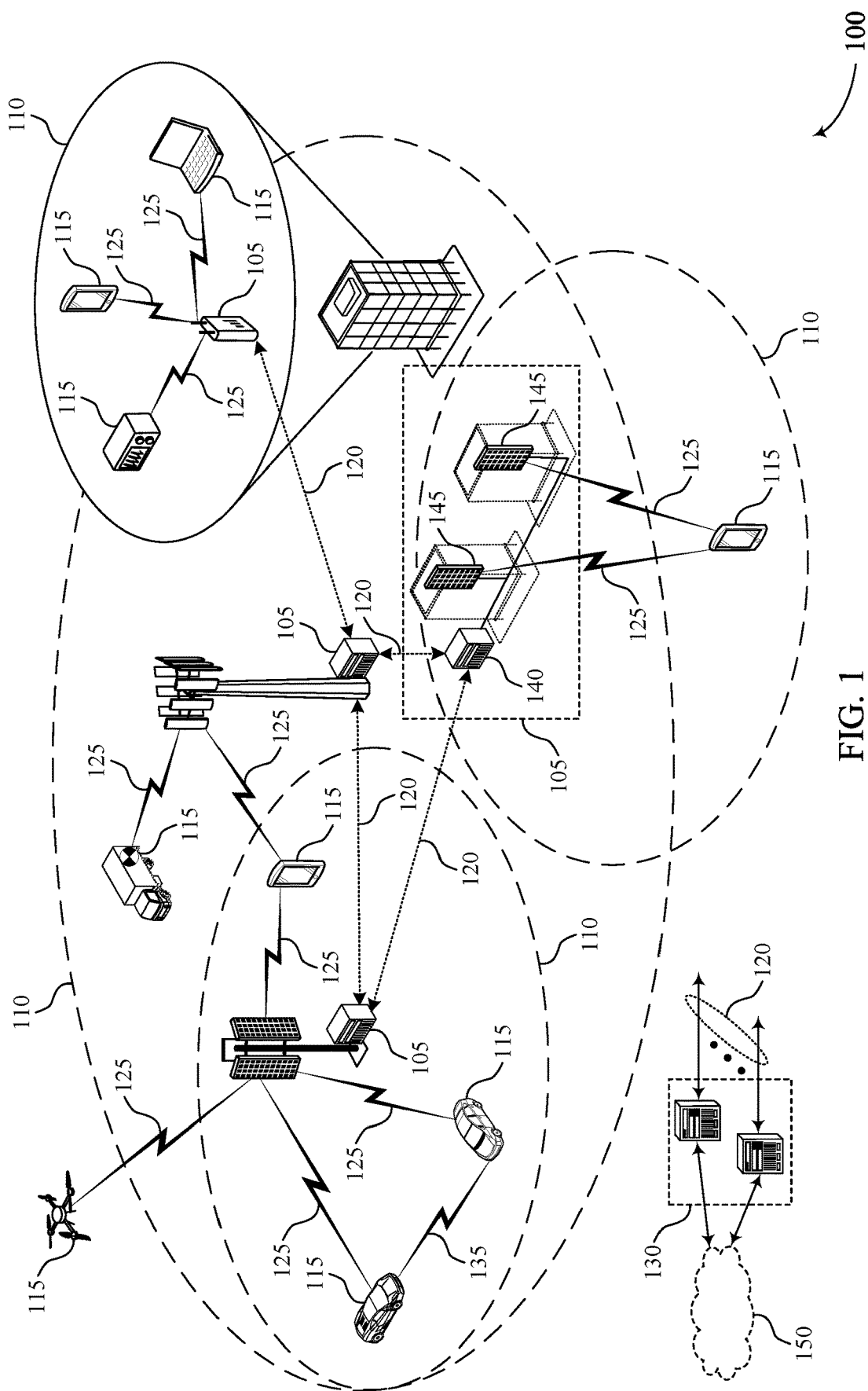
FIG. 1 illustrates an example of a wireless communications system that supports message repetition for a random access procedure based on a random access procedure format in accordance with aspects of the present disclosure.

A first device, such as a user equipment (UE), may attempt to connect to a second device, such as a base station, to establish a communication link between the first device and the second device. In some cases, the communication link between the first device and the second device may be associated with a link budget (e.g., a link budget threshold or link margin), which may be based on a quantity of transmission parameters and environmental factors. As demand for communication resources increases due to an increasing quantity of wireless devices communicating over the available spectrum, techniques to efficiently and reliably increase throughput are desirable. In some cases, additional frequency ranges may be used by communicating devices, which may enable devices to achieve higher throughput. Higher frequency ranges (e.g., such as frequency ranges used in FR2 radio frequency bands, including millimeter wave (mmW) frequency ranges) may be implemented for wireless communications, and transmitting at these higher frequencies involves transmitting signals with shorter wavelengths. Signals transmitted with shorter wavelengths may be susceptible to greater path losses than signals transmitted with relatively longer wavelengths, and such greater path losses may adversely affect the link budget threshold (e.g., a link margin) of a communication link (such as the communication link between the first device and the second device). In some cases, this may lead to an increase in communication failures.

In some aspects, a UE may attempt to connect to (e.g., establish a communication link with) a base station using a random access procedure. The UE may initiate the random access procedure by transmitting a random access request to the base station. The random access request may be referred to as a message 1 (or msg1) in examples in which the UE and the base station perform a four-step random access procedure or a message A (or msgA) in examples in which the UE and the base station perform a two-step random access procedure. As such, a random access request as described herein may correspond to or otherwise be referred to as a message 1 or a message A, or both. As part of the random access request, the UE may transmit a physical random access channel (PRACH) preamble to the base station indicating a request for resources to use to initiate the random access procedure.

The base station may acknowledge the random access request by transmitting a random access response (RAR) to the UE. The RAR may be referred to as a message 2 (or msg2) in examples in which the UE and the base station perform a four-step random access procedure or a message B (or msgB) in examples in which the UE and the base station perform a two-step random access procedure. As such, an RAR as described herein may correspond to or otherwise be referred to as a message 2 or a message B. The RAR may include control information (e.g., control information for receiving an RAR message) and data information (e.g., the RAR message) and the UE may expect to receive the RAR during a time window (e.g., an RAR window). For example, the base station may transmit the control information via a physical downlink control channel (PDCCH) to indicate a location (e.g., a frequency and a time) for where the UE may receive the RAR message (e.g., the data associated with the RAR) via a physical downlink shared channel (PDSCH) within the time window. In some aspects, the control information carried by the PDCCH associated with the RAR may be referred to as a portion of the RAR and the data (e.g., the RAR message) carried by the PDSCH associated with the RAR may be referred to as another portion of the RAR.

In some cases, the UE and the base station may be in a low connectivity condition based on a link budget threshold associated with the communication link between the UE and the base station. For example, the UE and the base station may communicate using higher frequency ranges (e.g., mmW frequency ranges, such as those included in the FR2 radio frequency bands) such that transmissions over the communication link may experience relatively greater path losses. Further, the base station may transmit the control information via PDCCH using a relatively wide beamwidth based on a quantity of SSBs associated with the PDCCH transmission. In some cases, the UE may receive the quantity of SSBs and compare a power, signal, or noise characteristic (e.g., a reference signal received power (RSRP), a reference signal received quality (RSRQ), a signal to interference noise ratio (SINR), a signal-to-noise ratio (SNR), etc.) of the received SSBs to a threshold. Additionally or alternatively, the UE and the base station may be in a low connectivity condition for a variety of other reasons, such as environmental factors (e.g., separation distance, signal obstruction, etc.). Such conditions may result in an increase in communication failures over the communication link. For instance, in examples in which the UE and the base station are in a low connectivity condition, the UE may be unable to successfully receive (e.g., decode) the control information of the RAR transmitted by the base station and, likewise, may be unable to receive the RAR from the base station. Similarly, the UE may be unable to successfully receive the data associated with the RAR (e.g., the RAR message) via the PDSCH. In such examples, the random access procedure may fail and the UE and the base station may not establish a communication link.

In some examples of the present disclosure, the UE and the base station may support a reconfigured time window during which the UE may receive the RAR that may increase the likelihood for the UE to successfully receive the control information or data associated with the RAR, or both. For instance, the base station may configure an RAR window to increase the chance that the UE may successfully receive and decode the RAR. In some implementations, the base station may configure the RAR window to enable a first portion of the RAR window to support communication of single instances of the control information or the data, or both, associated with the RAR and a second portion of the RAR window to support communication of repeating instances of the control information or the data, or both, associated with the RAR. During the second portion of the RAR window, the UE may identify and combine (e.g., using soft combining) multiple instances of the control information to improve the likelihood that the UE may be able to successfully decode the control information and identify the location of the RAR message. Additionally or alternatively, the UE may identify and combine (e.g., using soft combining) multiple instances of the RAR message (e.g., the data associated with the RAR) to improve the likelihood that the UE may be able to successfully receive the RAR message and advance the random access procedure.

In some implementations, the UE and the base station may support such a reconfigured RAR window based on a mutual understanding of a repetition pattern that the base station may use to transmit the control information or the data, or both, associated with the RAR in one or more portions of the RAR window. In some examples, the UE and the base station may employ a mapping between a PRACH format (e.g., the PRACH format used to transmit the random access request) or a set of resources associated with the PRACH (e.g., the resources of the PRACH used to transmit the random access request) and a repetition pattern of the control information or the data associated with the RAR, or both, to facilitate the mutual understanding of the repetition pattern that the base station may use. For example, the UE may initiate the random access procedure by selecting a PRACH format or a set of resources associated with the PRACH (e.g., multiple resources of the PRACH) and may transmit the random access request based on the selected PRACH format or the set of resources associated with the PRACH. In some implementations, the UE may select the PRACH format or the set of resources associated with the PRACH based on a corresponding repetition pattern (e.g., a corresponding repetition pattern based on the mapping). As such, the UE may indirectly select a repetition pattern for the base station to use based on selecting a PRACH format or a set of resources associated with the PRACH that correspond to the repetition pattern. Accordingly, the base station may receive the random access request associated with the selected PRACH format or the set of resources associated with the PRACH and may determine to use the corresponding repetition pattern to transmit the control information or the data associated with the RAR, or both, in one or more portions of the RAR window. For example, if the UE selects multiple PRACH resources (e.g., to transmit the random access request with repetition), the UE may indirectly request the base station to transmit the RAR with repetition.

Additionally or alternatively, the UE and the base station may have a mutual understanding of a quantity of portions of the RAR window based on the selected PRACH format or the set of resources associated with the PRACH. In some examples, the base station may receive the random access request, identify the PRACH format or the set of resources associated with the PRACH selected by the UE, and determine to use an RAR window configuration based on a mapping between the PRACH format or the set of resources associated with the PRACH and an RAR window configuration. For example, the base station may determine to transmit instances of the control information or the data, or both, associated with the RAR according to a first repetition pattern in a first portion of the RAR window and may determine to transmit the instances of the control information or the data, or both, according to a second repetition pattern in a second portion of the RAR window based on the selected PRACH format or the set of resources associated with the PRACH.

The base station may transmit an indication of the mapping via a master information block (MIB) or a remaining minimum system information (RMSI), or a combination thereof. The UE may identify a quantity of repetitions, a repetition level, an index, a location, or any other information of the control information or the data associated with the RAR, or both, that may enable the UE to determine which transmissions may be instances of the control information or the data, or both, such that the UE may know which transmissions to combine within each portion of the RAR window. In some examples, the UE may combine the multiple transmissions of the control information according to the signaling and may attempt to decode the combined transmissions. In some cases, combining multiple transmissions of the control information may increase the likelihood that the UE will successfully decode the control information, and likewise may increase the chance that the UE will successfully receive the RAR message. Additionally or alternatively, the UE may combine multiple transmissions of the RAR message (e.g., the data associated with the RAR) to increase the likelihood that the UE will successfully decode the RAR message.

Particular aspects of the subject matter described herein may be implemented to realize one or more advantages. The described techniques may support a more robust random access procedure based on increasing the likelihood that the UE may successfully receive the control information or data associated with an RAR during an RAR window in low connectivity conditions. Further, a device implementing the techniques of the present disclosure may achieve power savings by reducing the quantity of repeats of the random access procedure before successfully connecting to a serving base station. For example, the device may identify an RAR window configuration for receiving the control information (e.g., in the PDCCH) and the data associated with the RAR and may employ a soft combining technique to increase the likelihood that the device may decode the control information and identify a location to receive the RAR message (e.g., in the PDSCH) and to increase the likelihood of receiving the RAR message, thereby increasing the chance for a successful random access connection. As such, supported techniques may include improved network operations and efficiencies, among other benefits.

Aspects of the disclosure are initially described in the context of wireless communications systems. Aspects of the disclosure are also described in the context of a process flow, a time window configuration, and a repetition schedule. Aspects of the disclosure are further illustrated by and described with reference to apparatus diagrams, system diagrams, and flowcharts that relate to message repetition for random access procedure based on a random access procedure format.

FIG. 1 illustrates an example of a wireless communications system 100 that supports message repetition for a random access procedure based on a random access procedure format in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a quantity of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The quantity of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the quantity of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a quantity of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured quantity of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples of the present disclosure, a base station 105 may configure an RAR window (e.g., a time window) as part of a random access procedure during which a UE 115 may expect to receive an RAR (e.g., a message 2 or a message B). Within an RAR window, the base station 105 may transmit control information (e.g., a PDCCH) associated with the RAR to the UE 115. In some cases, the control information may include the location (e.g., the time and frequency resources) of the RAR message (e.g., the data associated with the RAR) and the UE 115 may use the control information to determine how to receive the RAR message (e.g., a PDSCH) from the base station 105. In some implementations, the RAR window configuration may be based on a partition or an extension of the RAR window and two or more portions of the RAR window may be configured for different types control information transmissions or RAR message transmissions, or both.

In some examples, the different types of control information transmissions or RAR message transmissions may be associated with different transmission patterns (e.g., repetition patterns or repetition levels). In some aspects, the different repetition patterns may be based on a type of random access request transmitted to the base station 105 by the UE 115 (e.g., based on a mapping between the type of random access request and the repetition pattern). In some cases, the type of random access request may be associated with the PRACH format or the set of resources of the PRACH that the UE used to transmit the random access request. The UE 115 may select the type of random access request from a set of types of random access request, where different types of random access request may correspond to different repetition levels. For example, a first type of random access request may correspond to transmission of the random access request with repetition and a second type of random access request may correspond to transmission of the random access request without repetition. In some examples, a mutual understanding between the UE 115 and the base station 105 of the mapping between the types of random access request and the repetition pattern may enable the UE 115 and the base station 105 to determine a repetition pattern that may be used for control information or data associated with an RAR, or both, with minimal additional signaling. For example, the mapping may provide a correspondence between a repetition level of a random access request (e.g., with repetition or without repetition) and a repetition pattern of an RAR responsive to the random access request.

In some cases, the UE 115 may select a type of random access request from a set of types of random access request based on a connectivity condition associated with the UE 115. In some cases, the connectivity condition may be associated with a quality of the channel associated with (e.g., used for) the random access procedure. In some aspects, the UE 115 may identify the quality of the channel based one or more measurements of transmissions on the channel associated with the random access procedure. For instance, the UE 115 may measure an RSRP or an RSRQ of one or more SSBs, determine the connectivity condition based on the measured RSRP or RSRQ, and select the type of random access request based on the connectivity condition. As such, in examples in which the measured RSRP or RSRQ is below a threshold level, the UE 115 may select the type of random access request that corresponds to a repetition pattern of the control information or the data associated with an RAR, or both, that may enable the UE 115 have a greater likelihood to successfully receive and decode the control information or the data, or both. In some implementations, the base station 105 may receive the random access request and may identify that the random access request is a first type of random access request. Accordingly, the base station 105 may determine to transmit the control information or the data associated with the RAR, or both, during a portion of the RAR window with a repetition pattern corresponding to the first type of random access request (e.g., based on the mutually understood mapping between the type of random access request and the repetition pattern).

In some examples, the selected type of random access request may correspond to a repetition pattern in a first portion of the RAR window and the repetition pattern may correspond a quantity of repetitions, one or more indices, one or more locations, or any other information that may enable the UE 115 to identify which instances (e.g., candidates) of the control information or the data associated with the RAR, or both, may belong to the same repetition pattern (e.g., which control information instances may be repeats of each other or which data instances may be repeats of each other). Accordingly, the base station 105 may identify the repetition pattern, identify that the random access procedure is operating within the first portion of the RAR window, and transmit the control information or the data associated with the RAR, or both, to the UE 115 based on the repetition pattern.

Likewise, the UE 115 may identify that the random access procedure is operating within the first portion of the RAR window and may monitor (e.g., receive) the instances of the control information or the data associated with the RAR, or both, based on the repetition pattern. In some examples, the UE 115 may identify the quantity of instances of the control information or the RAR, or both, and may combine the instances that may be repeats of each other (e.g., the instances of the control information or the data associated with the RAR, or both, that may include similar or identical copies of the control information). The UE 115 may combine the instances of the control information or the data, or both, and decode the combination of the instances to increase the likelihood of a successful random access procedure.

Figure 2:
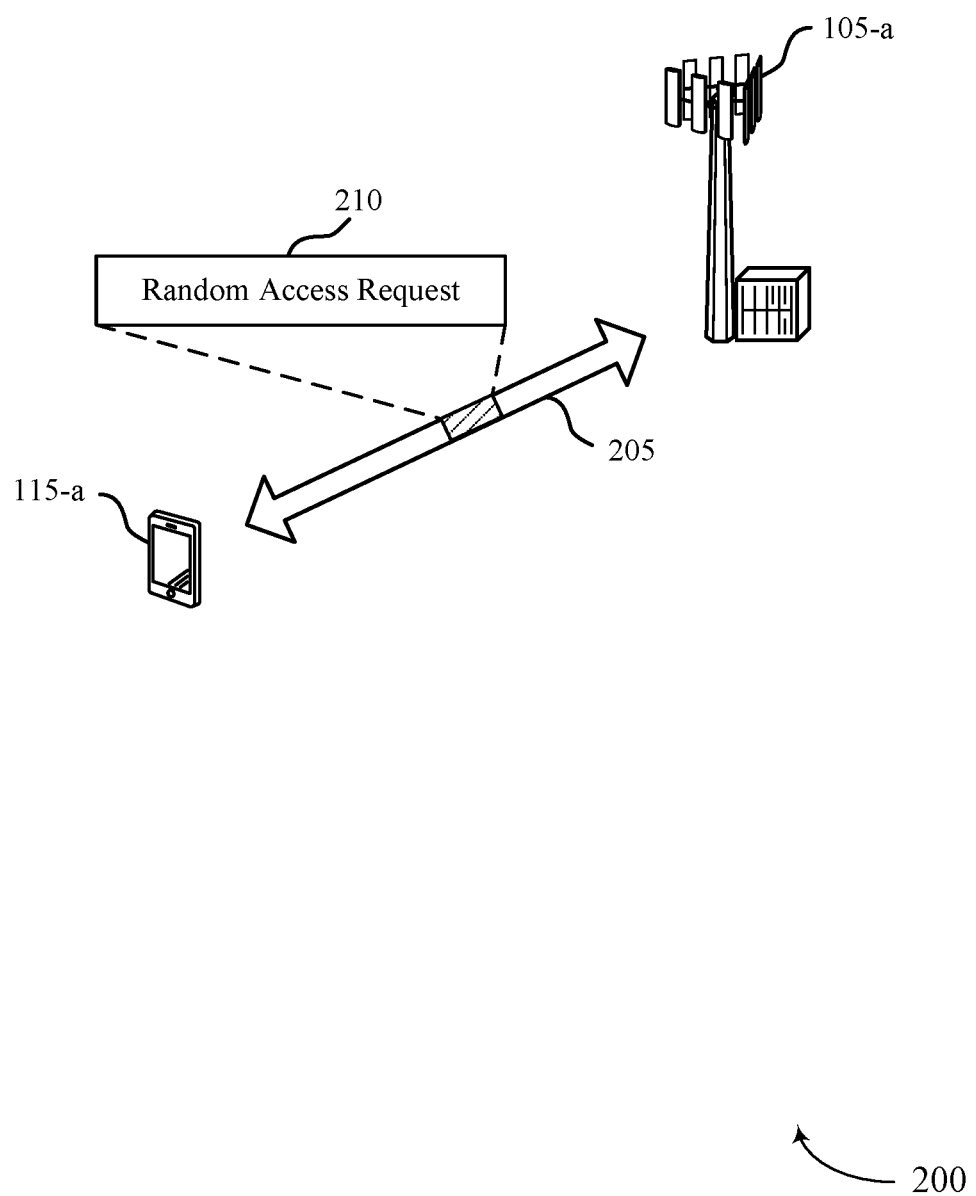
FIG. 2 illustrates an example of a wireless communications system that supports message repetition for a random access procedure based on a random access procedure format in accordance with aspects of the present disclosure.

FIG. 2 illustrates an example of a wireless communications system 200 that supports message repetition for a random access procedure based on a random access procedure format in accordance with aspects of the present disclosure. In some examples, wireless communications system 200 may implement aspects of wireless communications system 100. In some cases, the wireless communications system 200 may include a UE 115-a and a base station 105-a, which may be examples of UEs 115 and base stations 105 as described with reference to FIG. 1. The UE 115-a and the base station 105-a may communicate over a communication link 205. In some cases, the wireless communications system 200 (e.g., a 5G or an NR system that supports high frequency communications, such as communication over FR2 radio frequency bands) may support enhancements for random access procedures at both ends of a communication link 205 (e.g., for both the UE 115-a and the base station 105-a).

In some cases, the UE 115-a may not be connected to a serving base station (e.g., such as the base station 105-a) and may initiate a random access procedure to attempt to connect to the base station 105-a. The UE 115-a may receive system information (e.g., via a system information block (SIB), such as SIB1, SIB2, or RMSI) from the base station 105-a via a broadcast message (e.g., via a PBCH) and may identify configuration information associated with the random access procedure based on the system information. For example, the base station 105 may broadcast information about a set of resources or a power level that may be used by the UE 115-a during the random access procedure. Additionally, the base station 105-a may broadcast, via the system information (e.g., RMSI), a time window length (e.g., an RAR window length) that the connecting UE 115-a may monitor for an RAR (e.g., both the control information and the data, or RAR message, associated with the RAR). In some cases, the base station 105-a may indicate the RAR window length via an indicator in the system information. For instance, the base station 105-a may indicate the RAR window length via a bit in a bitfield of an RMSI or implicitly via another indicator of an RMSI.

The UE 115-a may transmit a random access request 210 to the base station 105-a to initiate the random access procedure, which may include a PRACH preamble and a radio network temporary identifier (RNTI), such as a random access RNTI (RA-RNTI). The UE 115-a, using the random access request 210, may indicate information to the base station 105-a about its resource requirement (e.g., a request for resources for performing the random access procedure). The base station 105-a may receive the random access request 210 from the UE 115-a and may respond by transmitting an RAR (e.g., including an RAR message and control information for receiving the RAR message). In some cases, the UE 115-a may expect to receive the RAR within the RAR window indicated by the system information broadcast by the base station 105-a. During the RAR window, the base station 105-a may transmit control information carried by a control channel (e.g., a PDCCH) that may indicate to the UE 115-a the location (e.g., the time and frequency resources) of the RAR message carried by a data channel (e.g., a PDSCH).

In some cases, the base station 105-a may transmit a quantity of single instances of the control information and the RAR message during a quantity of slots included in the RAR window length. As such, the UE 115-a may attempt to receive and decode each instance of the control information and each instance of the RAR message independently. For example, if the UE 115-a is unable to receive and decode a first instance of the control information or the data associated with the RAR, the UE 115-a may discard the unsuccessfully received or decoded control information or data and may attempt to receive and decode a second instance of the control information or the data without storing any information associated with the first instance. This process may repeat for a monitoring occasion of each slot for the length of the RAR window until the UE 115-a successfully receives and decodes a control information transmission and an RAR message transmission or until the RAR window length expires.

In the case of receiving the control information, and upon successful reception of the control information, the UE 115-a may decode the control information and perform a parity check (e.g., a cyclic redundancy check (CRC)) on the control information. Based on performing the parity check, the UE 115-a may determine that the control information is relevant to an RAR message from the base station 105-a. In cases in which the decoding and the parity check are successful and the RAR message is decoded, the UE 115-*a* may transmit a message 3 (e.g., an RRC connection request) to the base station 105-*a* and the random access procedure may advance (e.g., the random access procedure may advance to a next step).

In some cases, the communication link 205 between the UE 115-*a* and the base station 105-*a* may be associated with a link budget threshold (e.g., a link margin) based on the link characteristics of the communication link 205. For example, a path loss, a received signal strength, a received signal quality, and other characteristics may influence the link budget threshold of the communication link 205. As wireless communications systems, such as the wireless communications system 200, aim to more efficiently and reliably increase throughput, additional frequency ranges may be used by communicating devices (e.g., UE 115-*a* and base station 105-*a*), which may enable devices to achieve higher throughput. Higher frequency ranges (e.g., such as frequency ranges included in the FR2 radio frequency bands, including millimeter wave (mmW) frequency ranges) may be implemented for wireless communications, and transmitting at these higher frequencies involves transmitting at shorter wavelengths.

In some wireless communications systems, the designations of FR1 and FR2 may refer to frequency ranges that are available for communicating within the wireless communications system. For example, FR1 may refer to a frequency range between about 450 MHz and about 7,125 MHz and FR2 may refer to a frequency range between about 24,250 MHz and about 52,600 MHz. Based on its relatively higher frequency, transmissions over FR2 radio frequency bands may have shorter wavelengths than transmissions over FR1 radio frequency bands. Shorter wavelengths may be susceptible to greater path losses, which may adversely affect the link budget threshold (e.g., a link margin) of the communication link 205. Additionally or alternatively, the base station 105-*a* may employ a relatively wide transmit beam for transmissions to the UE 115-*a*. For example, the beamwidth of the transmit beam of the base station 105-*a* may be based on (e.g., proportional to) the quantity of SSBs associated with the transmissions of the base station 105-*a*. Based on receiving signals via a beam with a relatively wide beamwidth, the UE 115-*a* may experience a lower received signal strength, which may also adversely affect the link budget threshold. In some cases, the link budget threshold may fall below a threshold value, which may result in an increase in communication failures over communication link 205.

In some examples, the base station 105-*a* may identify that the link budget threshold is below a threshold value and, accordingly, determine that the base station 105-*a* is operating in a low connectivity condition with the UE 115-*a*. In such examples, the control information associated with the RAR (e.g., the PDCCH of the message 2 or message B), or the RAR message (e.g., the PDSCH of the message 2 or message B), transmitted from the base station 105-*a* may have a lower likelihood for successful reception by the UE 115-*a* (e.g., based on the low connectivity and poor link conditions). If the control information cannot be successfully decoded, the UE 115-*a* may be unable to determine the location of the RAR message and therefore may be unable to transmit an RRC connection request, which may result in an unsuccessful termination of the random access procedure. Further, low connectivity and poor link conditions may lower the likelihood of receiving the RAR message, even in cases in which the location of the RAR message is successfully determined, which may similarly result in an unsuccessful termination of the random access procedure. In such cases, the UE 115-*a* may restart the random access procedure by retransmitting the random access request 210 and monitoring a quantity of slots for the single instances of the control information again.

In some examples of the present disclosure, the UE 115-*a* and the base station 105-*a* may experience more successful random access procedures during low connectivity conditions by combining (e.g., using soft-combining) instances of the control information transmissions. However, some random access configurations (e.g., some RAR window configurations) may not support combining techniques implemented by the UE 115-*a*. As described herein, a configurable RAR window may be defined to enable a UE 115-*a* to combine multiple instances of the control information associated with the RAR during the RAR window and to decode and perform a parity check of the combined instances of the control information. Similarly, a configurable RAR window may be defined to enable the UE 115-*a* to combine multiple instances of the RAR message during the RAR window, which may increase the likelihood of successful reception of the RAR message.

In some implementations, the base station 105-*a* may configure an RAR window configuration to support combining multiple repetitions of the control information associated with the RAR or the RAR message, or both. In some examples, the base station 105-*a* may partition an initial (e.g., a default) RAR window length into two or more portions, and each portion may be associated with a different type of control information transmission pattern (e.g., a different repetition pattern). Additionally or alternatively, the base station 105-*a* may append one or more an additional RAR window length segments to the initial RAR window length and may configure the additional segments to support repeatedly transmitting instances of the control information. The portions of the initial RAR window length may be time intervals within the initial RAR window length (e.g., an initial time window for the RAR). Similarly, the appended segments to an initial RAR window length may be additional time intervals appended to the initial time window for the RAR, effectively extending the time window for an RAR.

In some examples, the base station 105-*a* may configure the RAR window based on receiving the random access request 210 from the UE 115-*a*. For example, the base station 105-*a* may configure the RAR window based on the type of random access request 210 that is received from the UE 115-*a*. For instance, the UE 115-*a* may receive, from the base station 105-*a*, an indication of a set of types of random access request 210 and an indication of a mapping between the set of types of random access request 210 and a set of RAR window configurations. In some cases, the base station 105-*a* may transmit the indications in an MIB or an RMSI, or a combination thereof.

In some cases, a type of random access request 210 may correspond to a PRACH format associated with a PRACH preamble (e.g., a PRACH format associated with the random access request 210). In some other cases, the type of random access request 210 may correspond to a set of resources of the PRACH (e.g., multiple PRACH resources) that the UE 115-*a* may use to transmit the random access request 210. In such cases, different sets of resources of the PRACH may enable transmission of the random access request 210 with repetition (e.g., if multiple PRACH resources are selected) or without repetition (e.g., if one PRACH resource is selected). Thus, the base station 105-*a* may indicate a quantity of PRACH formats or a quantity of sets of resources of the PRACH, or both, that may be used for a quantity of different types of random access request 210 to the UE 115-*a* in the MIB or the RMSI, or a combination thereof. In some examples, the UE 115-*a* may receive an indication of a single PRACH format that may be used for the random access request 210 and a quantity of sets of resources associated with the single PRACH format, and the UE 115-*a* and the base station 105-*a* may differentiate between the different types of the random access request 210 based on the set of resources associated with the PRACH format that the UE 115-*a* uses to transmit the random access request 210.

In some examples, the UE 115-*a* may select the type of random access request 210 from the set of types of random access request 210 based on the operating connectivity of the UE 115-*a*, which may be based on one or more measurements (e.g., channel quality measurements) associated with receiving one or more signals (e.g., SSBs) from the base station 105-*a*. For example, the UE 115-*a* may measure an RSRP or an RSRQ, or any other channel quality measurements, based on receiving the one or more SSBs. In some cases, the UE 115-*a* may use the RSRP or RSRQ measurements to determine the operating connectivity condition of the UE 115-*a* and the UE 115-*a* may select the type of random access request 210 (such as a type of random access request 210 with repetition or a type of random access request 210 without repetition) based on the operating connectivity condition. Additionally or alternatively, the UE 115-*a* may identify that the UE 115-*a* belongs to a group of UEs 115-*a* associated with an operating connectivity condition based on the channel quality measurements or an indication from the base station 105-*a* and may select the type of random access request 210 based on belonging to the group of UEs 115-*a*.

In either or both cases, the UE 115-*a* may identify an operating connectivity condition and may select a type of random access request 210 based on the operating connectivity condition, where the type of random access request 210 may correspond to an RAR window configuration based on the received mapping. In some examples, the UE 115-*a* may identify a low operating connectivity condition (e.g., associated with a low RSRP or RSRQ or a poor link condition) and may select, based on the mapping indicated by the base station 105-*a*, a first type of random access request 210 (such as a random access request 210 transmitted over a set of multiple PRACH resources, for example, with repetition) that corresponds to an RAR window configuration associated with one or more portions including repetition patterns of the control information or the data associated with the RAR, or both, than a second type of random access request 210 (such as a random access request 210 transmitted over one PRACH resource or transmitted without repetition) associated with a higher operating connectivity condition.

Likewise, the base station 105-*a* may receive the first type of random access request 210 and may determine the RAR window configuration (e.g., may determine the repetition pattern for the RAR window) based on the first type of random access request 210 and the mapping. Accordingly, the base station 105-*a* may transmit the control information or the data associated with the RAR, or both, based on the RAR window configuration. In some examples, the base station 105-*a* may configure the RAR window to include two or more portions, such that a first portion may support the transmission of repeating instances of the control information or the data associated with the RAR, or both, and a second portion may support the transmission of single instances of the control information or the data, or both.

The base station 105-*a* may configure the repetition pattern of the first portion based on the first type of random access request 210 and the mapping. In some examples, the repetition pattern may correspond to a quantity of slots of the total quantity of slots within the first portion of the RAR window (e.g., a subset of slots of the total quantity of slots of the first portion) during which the base station 105-*a* may transmit, and the UE 115-*a* may receive, instances of the control information or the data associated with the RAR, or both. As such, during the first portion of the RAR window, the UE 115-*a* may receive and combine the repeating instances of the control information or the data, or both, in the quantity of slots. In some implementations, the UE 115-*a* may effectively increase the received signal strength of the control information transmissions or the data transmissions, or both, based on combining repetitions of the transmissions together, thereby increasing the likelihood of successful decoding.

Figure 3:
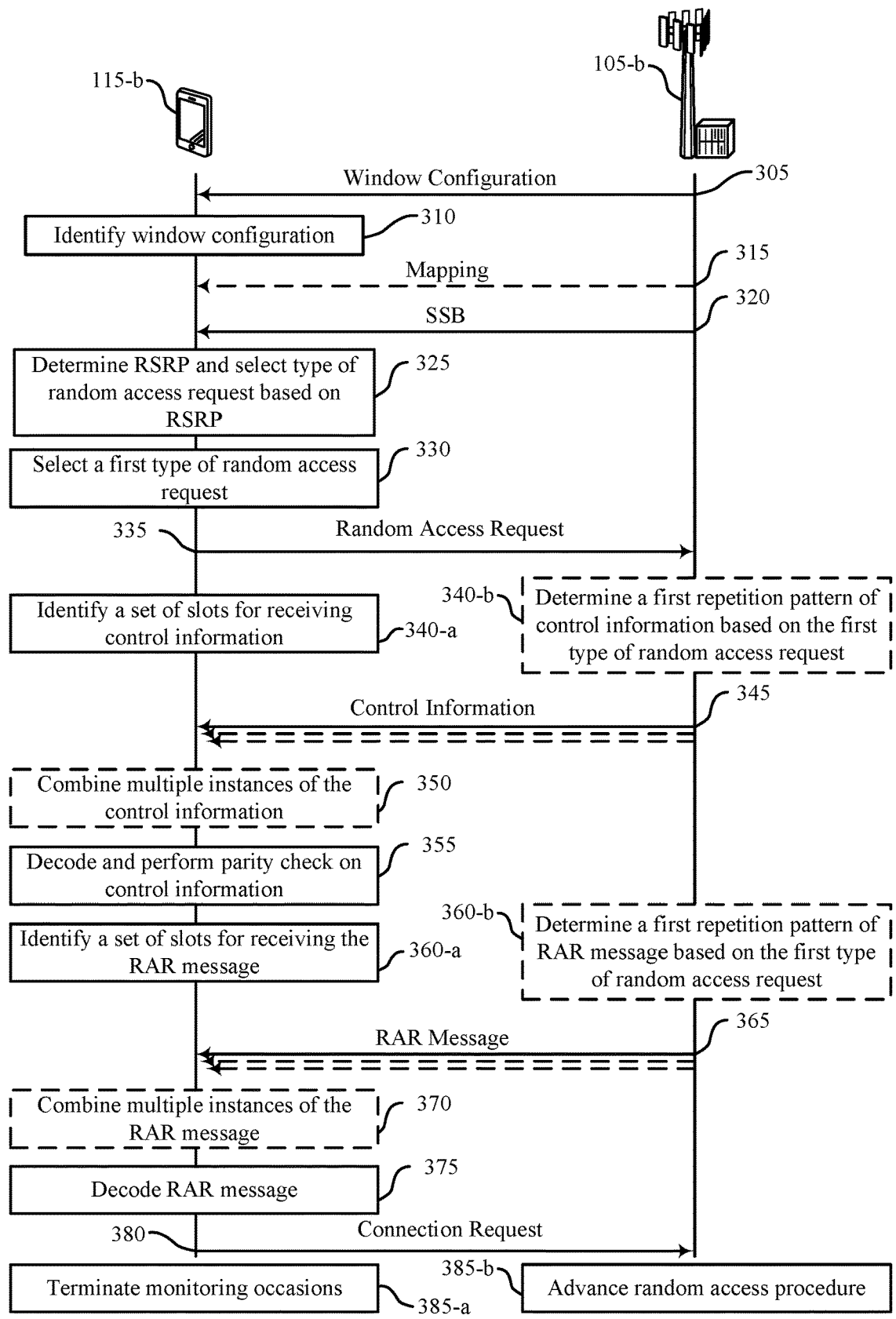
FIG. 3 illustrates an example of a process flow that supports message repetition for a random access procedure based on a random access procedure format in accordance with aspects of the present disclosure.

FIG. 3 illustrates an example of a process flow 300 that supports message repetition for a random access procedure based on a random access procedure format in accordance with aspects of the present disclosure. In some examples, the process flow 300 may implement or be implemented by aspects of the wireless communications system 100 or the wireless communications system 200. The process flow 300 may include a UE 115-*b* and a base station 105-*b*, which may be examples of corresponding devices described with reference to FIGS. 1 and 2. The UE 115-*b* and the base station 105-*b* may implement one or more techniques for soft-combining control information transmissions or data transmissions, or both, associated with an RAR during a random access procedure between the UE 115-*b* and the base station 105-*b*. Alternative examples of the following may be implemented, where some steps are performed in a different order than described or are not performed at all. In some cases, steps may include additional features not mentioned below, or further steps may be added.

At 305, the base station 105-*b* may transmit a window configuration (e.g., an RAR window configuration) to the UE 115-*b*. In some examples, the base station 105-*b* may transmit an indication of a first portion of the RAR window and a second portion of the RAR window via a bit in a bitfield of an RMSI.

At 310, the UE 115-*b* may identify the RAR window configuration received from the base station 105-*b*. In some examples, the UE 115-*b*, based on identifying the RAR window configuration, may identify a first portion of the RAR window and a second portion of the RAR window, and at least one portion of the RAR window may be configurable to support repeating instances and soft-combination. For example, the UE 115-*b* may identify that at least one portion of the RAR window may be configurable to support repeating instances of the control information associated with the RAR (e.g., the PDCCH of the message 2 or message B) or the data associated with the RAR (e.g., the PDSCH of the message 2 or message B).

At 315, the base station 105-*b* may optionally transmit an indication of a mapping. In some examples, the base station 105-*b* may transmit the indication of the mapping in an MIB or an RMSI, or a combination thereof. In some other examples, the base station 105-*b* and the UE 115-*b* may identify the mapping based on a definition in a specification. The mapping may define a correspondence between a set of different types of random access requests and a set of different repetition patterns that the base station 105-*b* may employ for control information transmissions or data transmissions associated with the RAR during the RAR window.

In some examples, the different types of random access requests may be different PRACH formats of the random access request (e.g., the format of a PRACH preamble). For example, the set of different types of random access requests may correspond to a set of different preambles. In some cases, the set of different preambles include one or more preambles associated with different preamble lengths. For instance, the set of different preambles may include at least a first preamble may have a first length and a second preamble having a second length different than the first length. Additionally or alternatively, the different types of random access requests may correspond to different sets of resources (e.g., different time and frequency resources) that the UE 115-*b* may use to transmit the random access request. For example, the set of types of random access request may correspond to a set of different resources of the PRACH that the UE 115-*b* may use to transmit the random access request. In some aspects, a set of resources may refer to multiple resources over which the UE 115-*b* may transmit the random access request with repetition. In some implementations, the base station may transmit an indication of the set of types of random access requests in the MIB or the RMSI.

At 320, the base station 105-*b* may transmit one or more SSBs to the UE 115-*b* as part of a connection procedure. In some cases, the base station 105-*b* may transmit the one or more SSBs on a channel that the may be associated with or similar to the channel used for the random access procedure.

At 325, the UE 115-*b* may measure or otherwise determine one or both of a received power or a received quality for the one or more SSBs. In some examples, the UE 115-*b* may measure or otherwise determine the quality of the channel (e.g., the connectivity condition of the UE 115-*b*) based on the received power or the received quality, or both, (e.g., based one or more of an RSRP, an RSRQ, an SINR, an SNR, etc.) for the one or more SSBs. The quality of the channel determined based on the one or more SSBs may be associated with the quality of the channel that the UE 115-*b* and the base station 105-*b* may use for the random access procedure. Accordingly, the UE 115-*b* and the base station 105-*b* may adjust the random access procedure based on the determined quality of the channel. In some cases, the UE 115-*b* may identify that the quality of the channel is below a threshold value and may determine that repetition of a portion of the RAR may increase the likelihood of the UE 115-*b* successfully receiving the RAR and advancing the random access procedure. For example, the UE 115-*b* may determine to repeatedly receive instances of at least a portion of the RAR during the random access procedure.

At 330, the UE 115-*b* may select, based on determining to repeatedly receive instances of at least a portion of the RAR, a first type of random access request from the set of types of random access request. In some examples, the UE 115-*b* may select the first type of random access request based on the quality of the channel determined from the one or more SSBs and the connectivity condition of the UE 115-*b*. For example, the UE 115-*b* may identify that the UE 115-*b* is associated with a low channel quality or a poor connectivity condition and may determine to select the first type of random access request based on the correspondence between the first type of random access request and a first repetition pattern. In other words, the UE 115-*b* may select to transmit the random access request according to the first repetition pattern based on determining that the UE 115-*b* is in a relatively poor connectivity condition. Further, based on selecting the first type of random access request (such as a random access request transmitted with repetition), the UE 115-*b* may indirectly request the base station 105-*b* to transmit an RAR with repetition based on the mapping (e.g., the mapping transmitted to or otherwise identified by the UE 115-*b* at 315), which may increase the likelihood for the UE 115-*b* to successfully receive the RAR. For example, the UE 115-*b* may determine which type of random access request corresponds to which repetition pattern and may determine which type of random access request corresponds to repetition of the RAR based on the mapping.

At 335, the UE 115-*b* may transmit, to the base station 105-*b*, a random access request based on selecting the first type of random access request. In some examples, the UE 115-*b* may transmit the random access request based on a PRACH format or a set of resources associated with the PRACH. For example, the UE 115-*b* may transmit the random access request over a set of multiple PRACH resources with repetition.

At 340-*a*, the UE 115-*b* may identify a set of slots for receiving control information associated with the RAR. In some examples, the UE 115-*b* may identify the set of slots in a first portion of a time window for communicating the RAR (e.g., the RAR window), where each slot of the set of slots may be configured to provide a different instance of the control information associated with the RAR. The UE 115-*b* may identify the set of slots based on selecting the first type of random access request corresponding to the first repetition pattern. For example, the first repetition pattern may be associated with repeating instances of the control information in each of the set of slots.

At 340-*b*, the base station 105-*b* may optionally determine the first repetition pattern of a control information portion of the RAR based on receiving the first type of random access request. In some examples, the base station 105-*b* may determine that the first type of random access request (e.g., a random access request transmitted with repetition) corresponds to the first repetition pattern for the control information associated with the RAR based on the mapping. In some aspects, the base station 105-*b* may determine that the first repetition pattern indicates the set of slots of the RAR window (e.g., a subset of slots of a larger set of slots of the RAR window). The base station 105-*b* may determine that the set of slots may be used for repeatedly transmitting the control information associated with the RAR to the UE 115-*b*. In some other aspects, the base station 105-*b* may determine that the first repetition pattern may be associated with a single instance (or single instances) of the control information of the RAR (such that the single instance or single instances are incompatible with soft-combining).

At 345, the base station 105-*b* may transmit the control information associated with the RAR to the UE 115-*b*. In some examples, the base station 105-*b* may transmit a single instance of the control information. In some other examples, the base station 105-*b* may transmit repeating instances of the control information associated with the RAR in each slot of the set of slots according to the repetition pattern. In some aspects, the set of slots may be consecutive. In some cases, the number (e.g., the numerical quantity) of consecutive slots may be based on the first repetition pattern associated with the first type of random access request. Additionally or alternatively, the UE 115-*b* may monitor a location in each slot for the control information instances based on the repetition pattern. Additional information about repetition schedules is described with reference to FIG. 5.

At 350, the UE 115-*b* may optionally combine the received instances of the control information associated with the RAR identified from monitoring the set of slots. In some implementations, the UE 115-*b* may combine the received instances of the control information using soft-combining techniques. At 355, the UE 115-*b* may decode and perform a parity check on the control information. In cases in which the UE 115-*b* combines multiple instances of the control information, the UE 115-*b* may perform a parity check on the combination of the received instances and may decode the combined instances based on performing the parity check.

At 360-*a*, the UE 115-*a* may identify a set of slots for receiving the RAR message (e.g., the data associated with the RAR). For example, receiving the RAR message may include receiving the data associated with the RAR (e.g., the PDSCH of the message 2 or the message B). In some examples, the UE 115-*b* may identify the set of slots in a first portion of a time window for communicating the RAR message (e.g., the RAR window), and each slot of the set of slots may be configured to provide a different instance of the RAR message. In some aspects, the UE 115-*b* may identify the set of slots based on selecting the first type of random access request corresponding to the first repetition pattern. For example, the first repetition pattern may be associated with repeating instances of the data in each of the set of slots. Additionally or alternatively, the UE 115-*a* may identify the set of slots for receiving the RAR message based receiving and decoding the control information associated with the RAR.

At 360-*b*, the base station 105-*b* may optionally determine the first repetition pattern of a data portion of the RAR (e.g., the RAR message) based on receiving the first type of random access request. In some examples, the base station 105-*b* may determine that the first type of random access request (e.g., a random access request transmitted with repetition) corresponds to the first repetition pattern for the RAR message based on the mapping. In some examples, the base station 105-*b* may determine that the first repetition pattern indicates the set of slots of the RAR window (e.g., a subset of slots of the plurality of slots of the RAR window). The base station 105-*b* may determine that the set of slots may be used for repeatedly providing the RAR message to the UE 115-*b*. In some aspects, the base station 105-*b* may determine that the first repetition pattern may be associated with a single instance (or single instances) of the control information of the RAR.

At 365, the base station 105-*b* may transmit the RAR message to the UE 115-*b*. In some examples, the base station 105-*b* may transmit a single instance of the data. In some other examples, the base station 105-*b* may transmit repeating instances of the RAR message in each slot of the set of slots according to the repetition pattern. In some aspects, the set of slots may be consecutive. In some cases, the number (e.g., the numerical quantity) of consecutive slots may be based on the first repetition pattern associated with the first type of random access request (e.g., the repetition of the RAR message may be based on the repetition of the random access request). Additionally or alternatively, the UE 115-*b* may monitor a location in each slot for the data instances based on the repetition pattern. Additional information about repetition schedules is described herein, including with reference to FIG. 5.

In some implementations, the base station 105-*b* may repeatedly transmit a quantity of instances of the control information associated with the RAR and the RAR message (e.g., the data associated with the RAR). In some implementations, the base station 105-*b* may repeatedly transmit a quantity of instances of the control information and transmit single instances of the data. In some other implementations, the base station 105-*b* may transmit single instances of the control information and repeatedly transmit a quantity of instances of the data. In implementations in which the base station 105-*b* repeatedly transmits both the control information and the data, the base station 105-*b* may transmit the control information and the data with different repetition patterns or a same repetition pattern based on the first type of random access request and the mapping.

At 370, the UE 115-*b* may optionally combine the received instances of the RAR message identified from monitoring the set of slots. In some implementations, the UE 115-*b* may combine the received instances of the data using soft-combining techniques. At 375, the UE 115-*a* may decode the RAR message received as part of the random access procedure. In some examples, the UE 115-*b* may decode the RAR message with a higher likelihood of success based on decoding a combination of the received instances of the RAR message (e.g., combining and decoding the combination of the received instances of the RAR message). In some examples, the UE 115-*b* may successfully decode the RAR message and, likewise, the RAR.

At 380, the UE 115-*b* may transmit a connection request (e.g., an RRC connection request or a message 3). Accordingly, the base station 105-*b* may receive the connection request and, at 385-*b*, may advance the random access procedure based on receiving the connection request. Correspondingly, the UE 115-*b*, at 385-*a*, may terminate monitoring the set of slots associated with the first repetition pattern based on decoding the RAR and transmitting the connection request (e.g., advancing the random access procedure).

Figure 4:
FIG. 4 illustrates an example of a time window configuration that supports message repetition for a random access procedure based on a random access procedure format in accordance with aspects of the present disclosure.
Figure 4:
Figure 4:
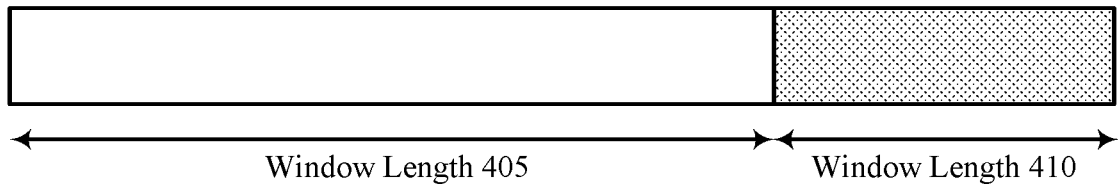

FIG. 4 illustrates an example of a time window configuration 400 that supports message repetition for a random access procedure based on a random access procedure format in accordance with aspects of the present disclosure. In some examples, the time window configuration 400 may implement or be implemented by aspects of the wireless communications system 100 or the wireless communications system 200. In some examples, a UE 115 may select a type of random access request that corresponds to a time window configuration 400 (e.g., an RAR window configuration) based on a channel quality (e.g., a connectivity condition of the UE 115) and a mapping received from a base station 105, as described with reference to FIGS. 1 through 3.

The time window configuration 400 may support two portions of an RAR window that may enable the UE 115 to employ soft-combining techniques to increase the likelihood that the UE 115 may successfully receive a portion of an RAR during a random access procedure. A portion of the RAR may correspond to a control information portion associated with the RAR (e.g., the PDCCH of the message 2 or message B) or may correspond to a data portion associated with the RAR, such as the RAR message (e.g., the PDSCH of the message 2 or message B).

In some examples, the base station 105 may broadcast (e.g., via a PBCH, a BCCH, a BCH, etc.) system information to a quantity of UEs 115. The system information may indicate a variety of information including a length of an RAR window and a quantity of portions of the RAR window. For instance, the base station 105 may transmit an indication of the length of the RAR window and the quantity of portions of the RAR window using a bit of a bitfield in an RMSI. Additionally or alternatively, the base station 105 may transmit an indication of a set of types of random access request and a mapping between the set of types of random access request and a time window configuration 400. The quantity of UEs 115 may identify a time window configuration 400 based on the mapping and the connectivity condition of the UE 115. In some examples, each UE 115 of the quantity of UEs 115 may perform a random access procedure to connect to the base station 105 according to a time window configuration 400 based on the type of random access request that the UE 115 transmits to the base station 105.

The time window configuration 400 may illustrate two portions as an example, but may include any quantity of portions without departing from the scope of the present disclosure. For example, an RAR window configuration may include one portion, two portions, three portions, four portions, five portions, six portions, seven portions, or eight portions, etc., where each portion may define a different repetition pattern or repetition level for the control information or the data associated with the RAR, or both. In the example of the time window configuration 400, the base station 105 may configure the RAR window to include a portion 415 with a window length 405 and a portion 420 with a window length 410.

In some examples, each portion may support different types (which may refer to with repetition or without repetition, as described herein) of control information transmissions (e.g., the PDCCH of the message 2 or message B) or data transmissions (e.g., the PDSCH of message 2 or message B), or both. For example, the portion 415 may support single instances of the control information transmissions or the data transmissions associated with the RAR, or both. In some cases, the portion 415 may relate to the second portion as described with reference to FIGS. 1 through 3, where a base station 105 may transmit single instances of the control information or the data associated with the RAR, or both. The portion 420 may be configured for repeatedly transmitting control information or repeatedly transmitting the data (e.g., the RAR message), or both. For example, the portion 420 may be associated with a first quantity of slots based on the window length 410, and the base station 105 may transmit identical copies of the control information or the data, or both, in each of a second quantity of slots (e.g., consecutive slots) according to a repetition pattern. In some examples, the base station may determine the repetition pattern based on the type of random access request received from the UE 115.

In some aspects, the base station 105 may repeatedly transmit the control information and the data during the portion 420 and may repeatedly transmit the control information according to a different repetition pattern than the data. For instance, the base station 105 may use a repetition pattern associated with four times repetition for control information and a repetition pattern associated with two times repetition for data. Alternatively, in another example, the base station 105 may use a repetition pattern associated with four times repetition for control information and a repetition pattern associated with zero times repetition for data (e.g., the base station 105 may transmit the data associated with the RAR without repetition). In some other aspects, the base station 105 may repeatedly transmit the control information and the data according to the same repetition pattern during the portion 420. In some examples, the control information may indicate the repetition pattern for the data. In some cases, the portion 420 may relate to the first portion as described with reference to FIGS. 1 through 3.

In some examples, the type of random access request may correspond to a quantity of (e.g., two or more) repetition patterns that the base station 105 may use in cases in which the RAR window is configured with two or more portions that support repeating instances of the control information or the data, or both, associated with the RAR. In such examples, a repetition pattern used for an initial portion configured for repeating instances of the control information or the data, or both, may be associated with a lower repetition level than a repetition pattern used for a subsequent portion that is also configured for repeating instances of the control information or the data, or both.

In some implementations, the UE 115 may transmit a first type of random access request (e.g., based on a first connectivity condition) that corresponds to a first repetition pattern that the base station 105 may use to repeatedly transmit instances of the control information or the data, or both. In some cases, the type of random access request may correspond to a PRACH format or a set of resources used to transmit the random access request, as described in more detail with reference to FIGS. 2 and 3. Based on receiving the indication of the time window configuration 400 in the bitfield of the RMSI and the indication of the mapping between the types of random access request and repetition patterns in an MIB or in the RMSI and selecting the first type of random access request, the UE 115 may expect to receive repeating instances of the control information or the data, or both, associated with the RAR in the portion 420 according to the first repetition pattern. Likewise, the base station 105 may receive the first type of random access request and may identify, based on the mapping, to transmit the control information or the data, or both, according to the first repetition pattern during the portion 420.

In some aspects, the first connectivity condition may correspond to a higher channel quality than a second connectivity condition and, accordingly, a second type of random access request that is based on the second connectivity condition may correspond to a second repetition pattern associated with a higher repetition level than the first repetition pattern. In some cases, the base station 105 may receive both the first type of random access request and the second type of random access request from two different UEs 115 associated with different connectivity conditions (e.g., different channel qualities). In such cases, the base station 105 may determine to use a different time window configuration 400 for each UE 115. In some aspects, the base station 105 may still use the same portioning of the time window configuration 400 for each UE 115, but may transmit the control information or the data, or both, according to different repetition patterns for each UE 115 based on the type of random access request received from each UE 115. For instance, the base station 105 may determine to transmit the control information or the data, or both, according to the first repetition pattern for the UE 115 that transmitted the first type of random access request and may determine to transmit the control information or the data, or both, according to the second repetition pattern for the UE 115 that transmitted the second type of random access request.

In some cases, the UE 115 may successfully receive the control information and the data, and likewise the RAR, prior to the end of the RAR window. For example, the UE 115 may successfully receive the control information and the data associated with the RAR during the portion 415 or during an early part (e.g., before the end) of the portion 420. In such examples, the UE 115 may terminate its monitoring occasions and may refrain from monitoring or receiving (e.g., combining and decoding) any additional instances of the control information or the data, or both.

Figure 5:
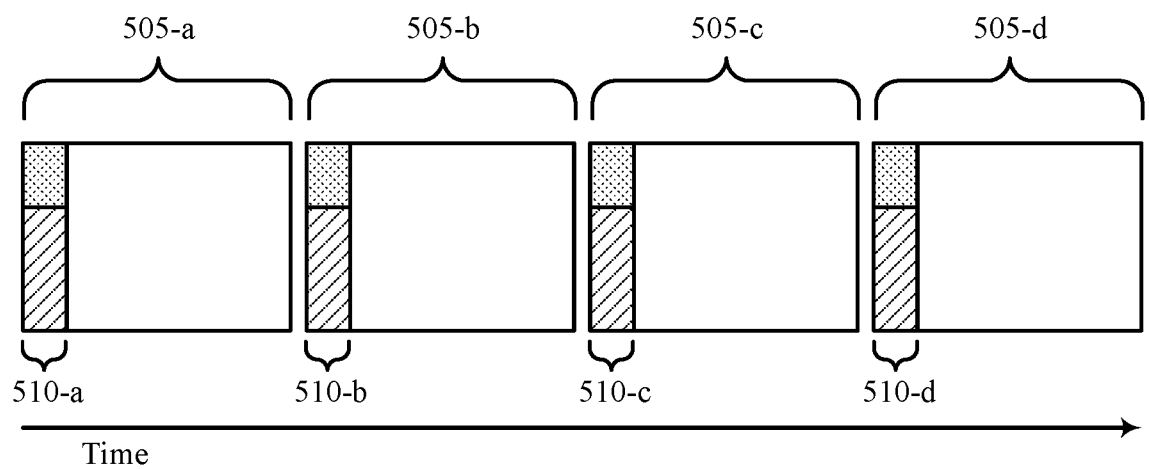
FIG. 5 illustrates an example of a repetition pattern that supports message repetition for a random access procedure based on a random access procedure format in accordance with aspects of the present disclosure.

FIG. 5 illustrates an example of a repetition pattern 500 that supports message repetition for a random access procedure based on a random access procedure format in accordance with aspects of the present disclosure. In some examples, the repetition pattern 500 may implement aspects of the wireless communications system 100 or the wireless communications system 200. In some examples, the repetition pattern 500 may illustrate how a base station 105 may transmit a quantity of instances of a control information 515 associated with an RAR in a quantity of consecutive slots. Additionally or alternatively, the base station may transmit a quantity of instances of the data associated the RAR (e.g., the RAR message) in a quantity of consecutive slots. Based on using the repetition pattern 500, a UE 115 may be more likely to connect to the base station 105 using a random access procedure during a low connectivity condition (e.g., associated with poor channel quality).

The repetition pattern 500 may include a quantity of slots, such as a slot 505-*a*, a slot 505-*b*, a slot 505-*c*, and a slot 505-*d*. A control resource set (CORESET) 520 may be inside each slot, and an instance of the control information 515 may be included inside each CORESET 520. In some examples, each instance of the control information 515 may be in the same location in each of the quantity of slots 505. For example, the base station 105 may transmit all instances of control information 515 associated with the same RAR such that the UE 115 may receive the control information at monitoring occasions 510-*a*, 510-*b*, 510-*c*, and 510-*d* (e.g., at the same location in each consecutive slot). Additionally or alternatively, each instance of the control information 515 may be associated with a same repetition pattern, and the UE 115 may identify the repetition pattern of each instance of the control information 515 to identify which instances of the control information 515 may be linked (e.g., combined). In some examples, each instance of the same control information 515 (e.g., control information that may be identical copies) may include the same quantity of CCEs. Additionally or alternatively, each instance of the control information 515 may be associated with an index that the UE 115 may use to link (e.g., combine) a quantity of instances of the control information 515. In some cases, one or more instances of the control information 515 may be in different locations in each of the quantity of slots 505.

Additionally or alternatively, a PDSCH 525 may be in each slot 505, and an instance of the data associated with the RAR (e.g., the RAR message) may be included inside the PDSCH 525 of each slot. In some examples, each instance of the data may be in the same location in each of the quantity of slots 505. In some cases, the repeating instances of the data may be at the same location in each consecutive slot. Additionally or alternatively, each instance of the data may be associated with a same repetition pattern or repetition level, and the UE 115 may identify the repetition pattern for each instance of the data to identify which instances of the data may be linked (e.g., combined). For example, each instance of the data may be associated with an index that the UE 115 may use to link (e.g., combine) a quantity of instances of the data. In some cases, one or more instances of the data may be in different locations in each of the quantity of slots 505. In some implementations, the UE 115 may use soft combination to combine the received instances of the data, which may provide a greater likelihood for the UE 115 to successfully decode the data. In some examples, the UE 115 may combine instances of the data received in two consecutive slots.

Figure 6:
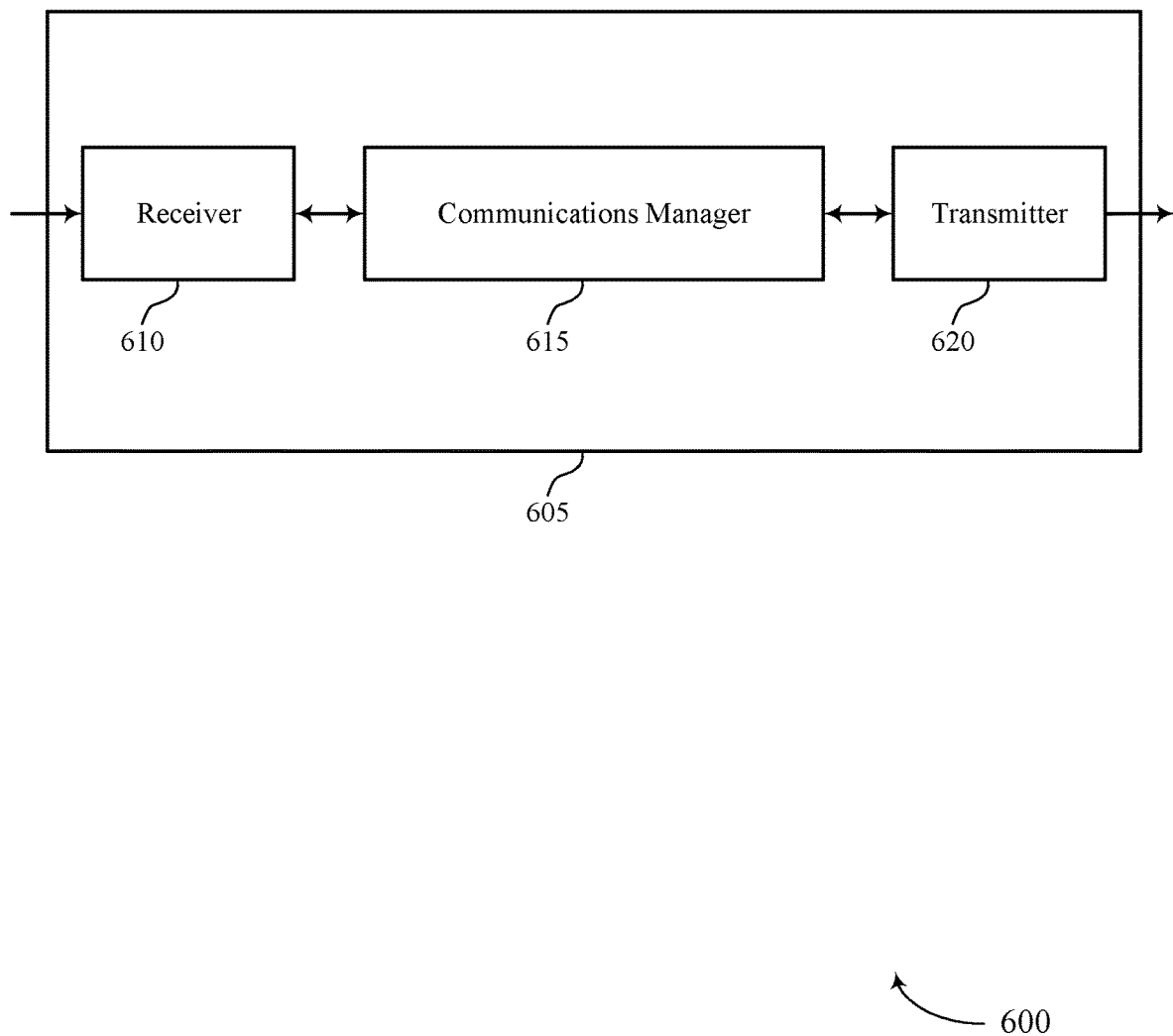
FIGS. 6 and 7 show block diagrams of devices that support message repetition for a random access procedure based on a random access procedure format in accordance with aspects of the present disclosure.

FIG. 6 shows a block diagram 600 of a device 605 that supports message repetition for a random access procedure based on a random access procedure format in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to message repetition for a random access procedure based on a random access procedure format, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may determine, based on a quality of a channel associated with a random access procedure, to repeatedly receive instances of at least a portion of an RAR during the random access procedure, identify, in a first portion of a time window for communicating the RAR and based on the selecting the first type of random access request, a set of slots, each configured to provide a different one of the instances of at least the portion of the RAR, select, based on the determining, a first type of random access request from a set of types of random access request, transmit, to a base station, a random access request of the first type based on the selecting the first type of random access request, and receive the instances of at least the portion of the RAR in the set of slots. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may allow the device 605 to reduce the quantity of repeats of the random access procedure before successfully connecting to a serving base station, which may result in fewer monitoring occasions and fewer transmissions for the device 605.

Based on the techniques described herein, a processor of the device 605 may perform fewer processing operations and may turn off one or more processing units associated with transmitting a random access request. As such, the device 605 may experience improved power savings and increased battery life.

Figure 7:
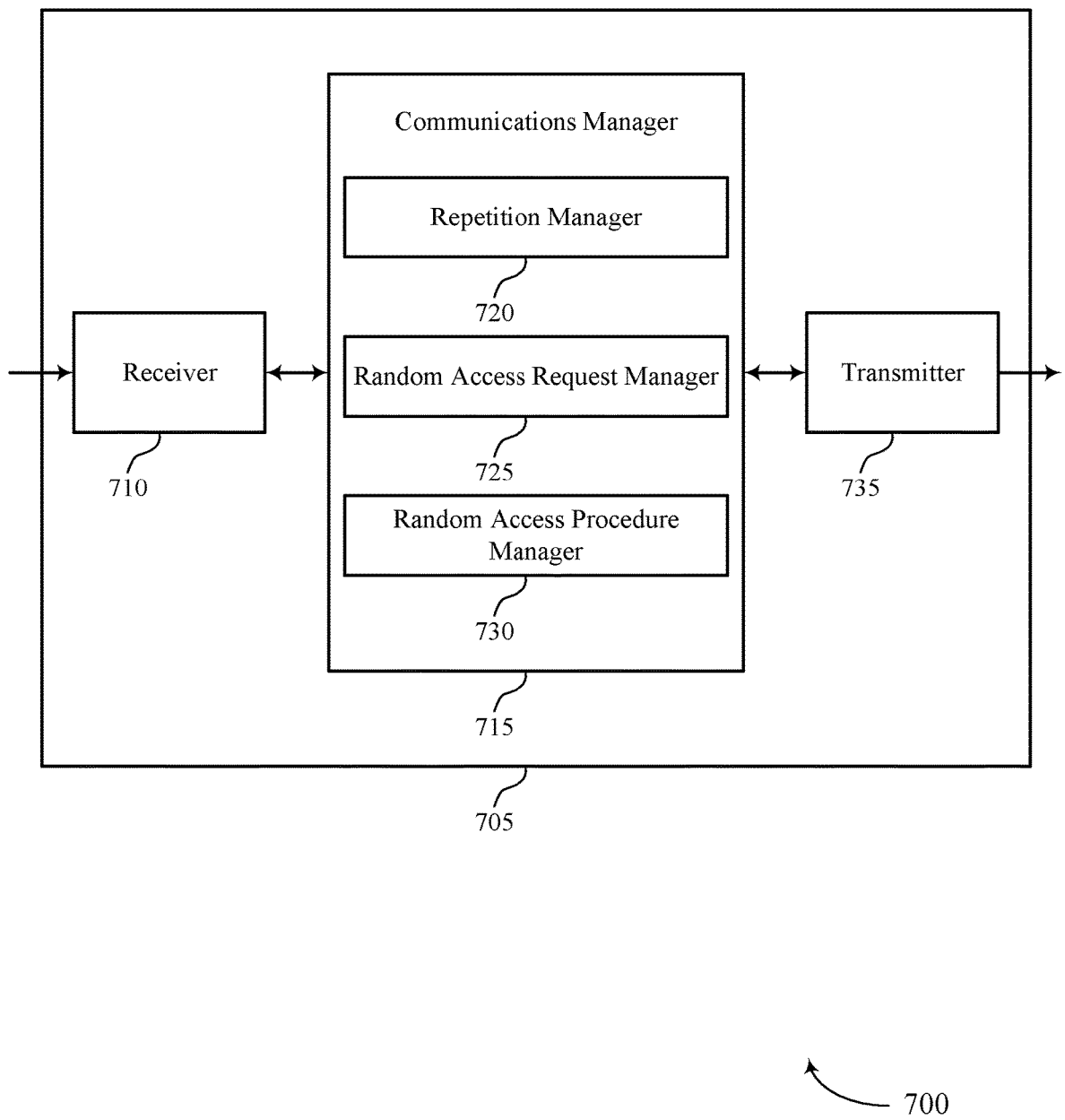

FIG. 7 shows a block diagram 700 of a device 705 that supports message repetition for a random access procedure based on a random access procedure format in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to message repetition for random access procedure based on a random access procedure format, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a repetition manager 720, a random access request manager 725, and a random access procedure manager 730. The communications manager 715 may be an example of aspects of the communications manager 910 described herein.

The repetition manager 720 may determine, based on a quality of a channel associated with a random access procedure, to repeatedly receive instances of at least a portion of an RAR during the random access procedure and identify, in a first portion of a time window for communicating the RAR and based on the selecting the first type of random access request, a set of slots, each configured to provide a different one of the instances of at least the portion of the RAR.

The random access request manager 725 may select, based on the determining, a first type of random access request from a set of types of random access request.

The random access procedure manager 730 may transmit, to a base station, a random access request of the first type based on the selecting the first type of random access request and receive the instances of at least the portion of the RAR in the set of slots.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
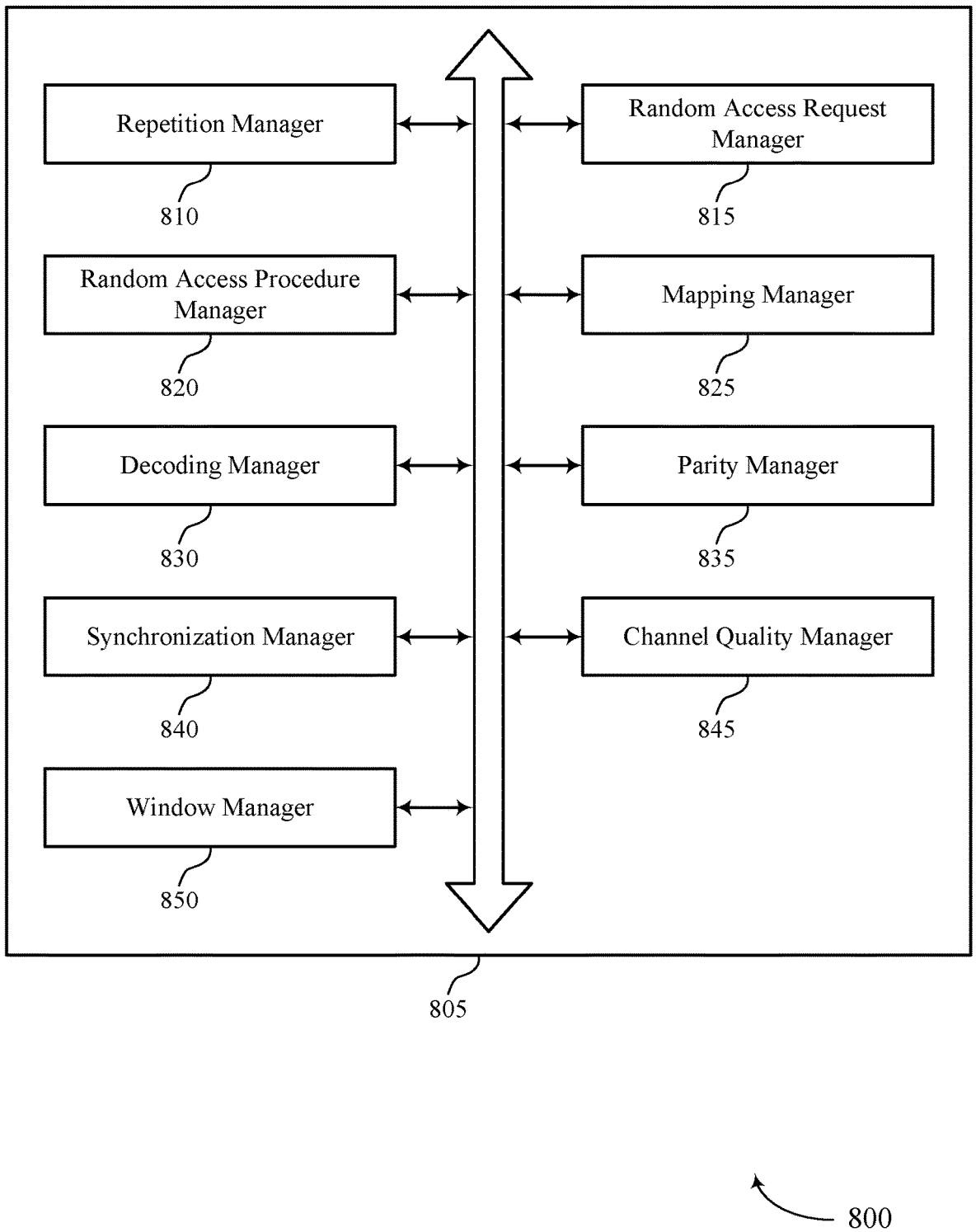
FIG. 8 shows a block diagram of a communications manager that supports message repetition for a random access procedure based on a random access procedure format in accordance with aspects of the present disclosure.

FIG. 8 shows a block diagram 800 of a communications manager 805 that supports message repetition for a random access procedure based on a random access procedure format in accordance with aspects of the present disclosure. The communications manager 805 may be an example of aspects of a communications manager 615, a communications manager 715, or a communications manager 910 described herein. The communications manager 805 may include a repetition manager 810, a random access request manager 815, a random access procedure manager 820, a mapping manager 825, a decoding manager 830, a parity manager 835, a synchronization manager 840, a channel quality manager 845, and a window manager 850. Each of these modules may communicate, directly or indirectly, with one another (e.g., via one or more buses).

The repetition manager 810 may determine, based on a quality of a channel associated with a random access procedure, to repeatedly receive instances of at least a portion of an RAR during the random access procedure. In some examples, the repetition manager 810 may identify, in a first portion of a time window for communicating the RAR and based on the selecting the first type of random access request, a set of slots, each configured to provide a different one of the instances of at least the portion of the RAR.

In some examples, the repetition manager 810 may monitor, during the first portion of the time window, the set of slots for the instances of at least the portion of the RAR based on identifying that the random access procedure is operating within the first portion of the time window. In some examples, the repetition manager 810 may combine the received instances of at least the portion of the RAR identified from monitoring the set of slots.

In some cases, the received instances include control information in a control channel. In some cases, the control channel includes a PDCCH. In some cases, the received instances include control information or data in a shared channel. In some cases, the shared channel includes a PDSCH. In some cases, the received instances include similar or identical copies of at least the portion of the RAR.

The random access request manager 815 may select, based on the determining, a first type of random access request from a set of types of random access request. In some examples, the random access request manager 815 may receive an indication of the set of types of random access request in one or more of an MIB, an RMSI, or a combination thereof. In some examples, the random access request manager 815 may select the first type of random access request based on determining to repeatedly receive the instances of at least the portion of the RAR according to a repetition pattern of the set of repetition patterns.

In some examples, the random access request manager 815 may select the first type of random access request based on the determined quality satisfying the quality threshold, where the first type of random access request is associated with a first quantity of repetitions of the instances of at least the portion of the RAR, and a second type of random access request of the set of types of random access request is associated with a second quantity of repetitions of the instances of at least the portion of the RAR, where the first quantity of repetitions is less than the second quantity of repetitions of the instances.

In some examples, the random access request manager 815 may select the first type of random access request based on the determined quality failing to satisfy the quality threshold, where the first type of random access request is associated with a first quantity of repetitions of the instances of at least the portion of the RAR, and a second type of random access request of the set of types of random access request is associated with a second quantity of repetitions of the instances of at least the portion of the RAR, where the first quantity of repetitions is greater than the second quantity of repetitions of the instances.

In some cases, each of the set of types of random access request is a different one of a set of formats of the random access request, where the first type of random access request is a first format of the set of formats. In some cases, the set of formats of the random access request include a set of different preambles. In some cases, each type of the set of types of random access request is associated with a different subset of preamble sequences of a plurality of preamble sequences. In some cases, the set of different preambles include at least a first preamble having a first length and a second preamble having a second length different from the first length. In some cases, each of the set of types of random access request is associated with a different set of resources of a set of sets of resources.

The random access procedure manager 820 may transmit, to a base station, a random access request of the first type based on the selecting the first type of random access request. In some examples, the random access procedure manager 820 may receive the instances of at least the portion of the RAR in the set of slots. In some cases, the transmitted random access request is a message A (or msgA) of the random access procedure, and the RAR is a message B (or msgB) of the random access procedure. In some cases, the transmitted portion of the random access request is a message 1 (or msg1) of the random access procedure, and the RAR is a message 2 (or msg2) of the random access procedure.

The mapping manager 825 may identify a mapping between the set of types of random access request and a set of repetition patterns for receiving the instances of at least the portion of the RAR in the set of slots. In some examples, the mapping manager 825 may receive an indication of the mapping in one or more of an MIB, an RMSI, or a combination thereof.

The decoding manager 830 may decode the RAR received as part of the random access procedure based on combining the received instances.

The parity manager 835 may perform a parity check on the combination of the received instances, where decoding the RAR is based on performing the parity check.

The synchronization manager 840 may receive one or more synchronization signal blocks.

The channel quality manager 845 may determine one or both of a received power or a received quality for the one or more synchronization signal blocks, where the quality of the channel is based on the one more of the received power or the received quality for the one or more synchronization signal blocks. In some examples, the channel quality manager 845 may determine the quality of the channel associated with a random access channel. In some examples, the channel quality manager 845 may compare the determined quality of the channel with a quality threshold.

The window manager 850 may receive, from the base station, an indication of the first portion of the time window and the second portion of the time window via a bit in a bitfield of an RMSI.

In some cases, the first portion of the time window for communicating the RAR is preceded by a second portion of the time window for communicating the RAR, the second portion of the time window configured for providing an instance of at least the portion of the RAR without repetition.

Figure 9:
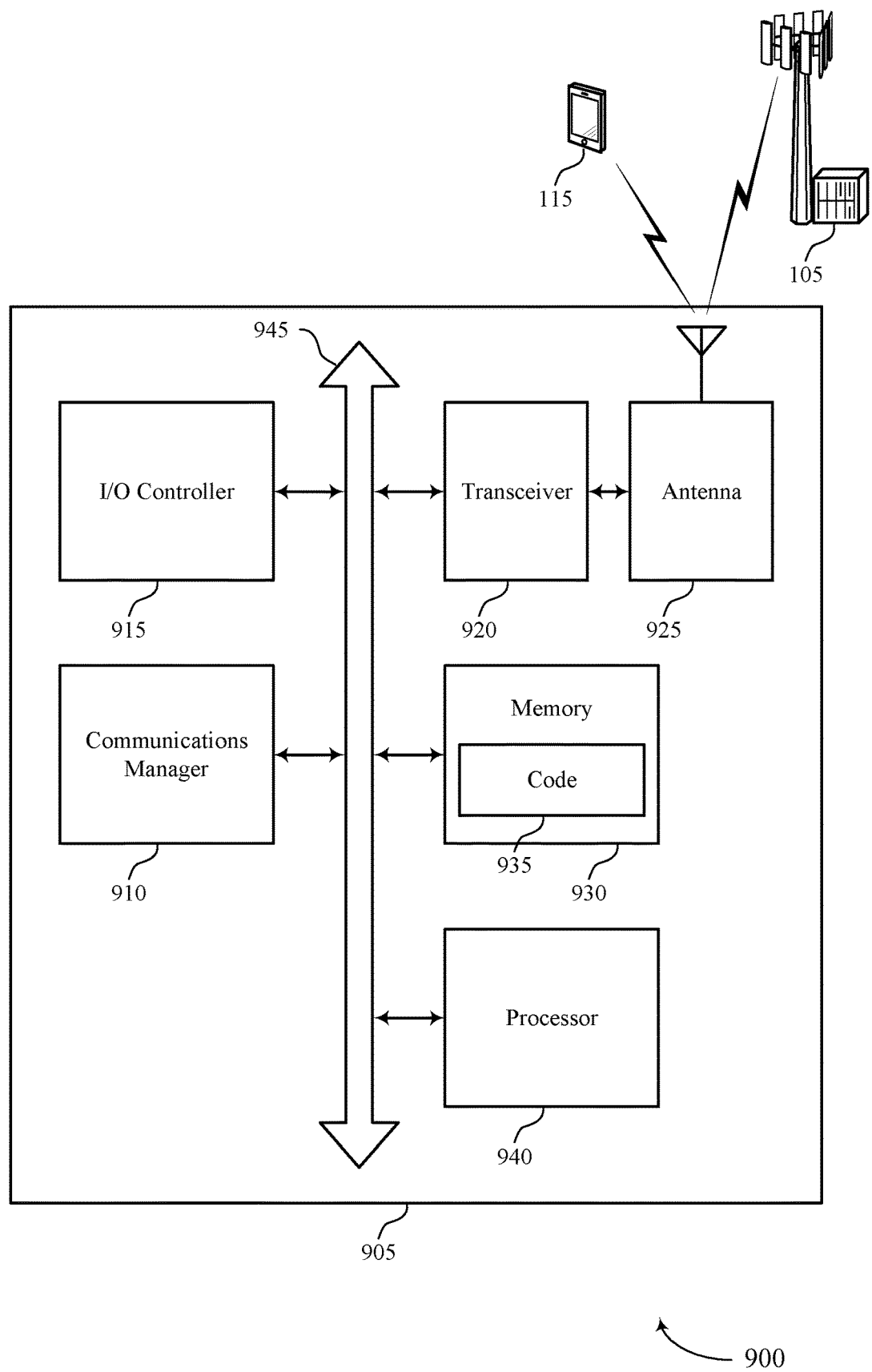
FIG. 9 shows a diagram of a system including a device that supports message repetition for a random access procedure based on a random access procedure format in accordance with aspects of the present disclosure.

FIG. 9 shows a diagram of a system 900 including a device 905 that supports message repetition for a random access procedure based on a random access procedure format in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may determine, based on a quality of a channel associated with a random access procedure, to repeatedly receive instances of at least a portion of an RAR during the random access procedure, identify, in a first portion of a time window for communicating the RAR and based on the selecting the first type of random access request, a set of slots, each configured to provide a different one of the instances of at least the portion of the RAR, select, based on the determining, a first type of random access request from a set of types of random access request, transmit, to a base station, a random access request of the first type based on the selecting the first type of random access request, and receive the instances of at least the portion of the RAR in the set of slots.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include rand-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting message repetition for random access procedure based on a random access procedure format).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
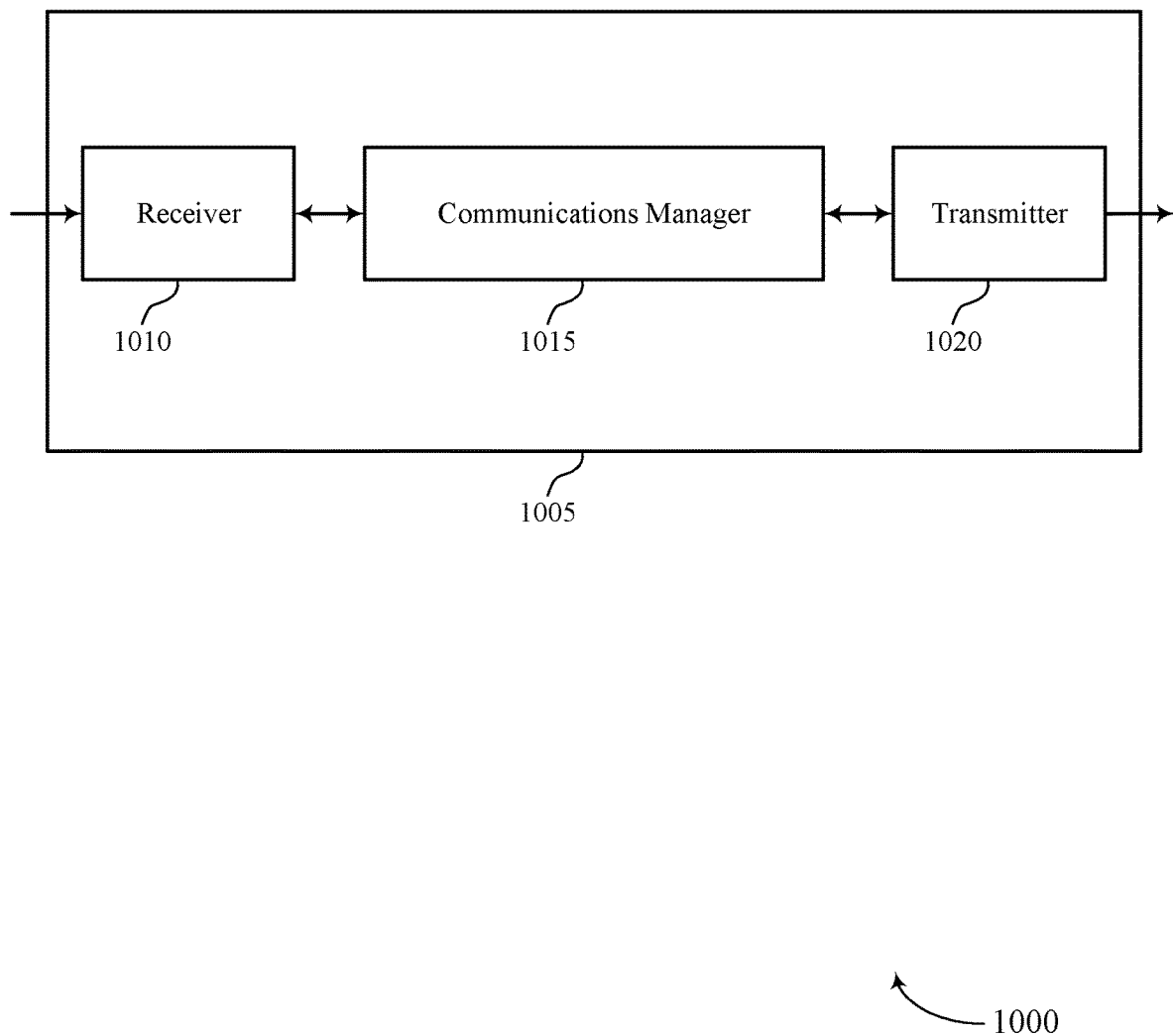
FIGS. 10 and 11 show block diagrams of devices that support message repetition for a random access procedure based on a random access procedure format in accordance with aspects of the present disclosure.

FIG. 10 shows a block diagram 1000 of a device 1005 that supports message repetition for a random access procedure based on a random access procedure format in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to message repetition for random access procedure based on a random access procedure format, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, from a UE, a random access request of a random access procedure, identify that the random access request is a first type of random access request from a set of types of random access request, determine, based on the random access request being the first type of random access request, a repetition pattern for a time window for communicating an RAR, the repetition pattern indicating at least a subset of slots of a set of slots of the time window, the set of slots for repeatedly providing at least a portion of the RAR to the UE, and transmit the portion of the RAR in each slot of the subset of slots according to the repetition pattern. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
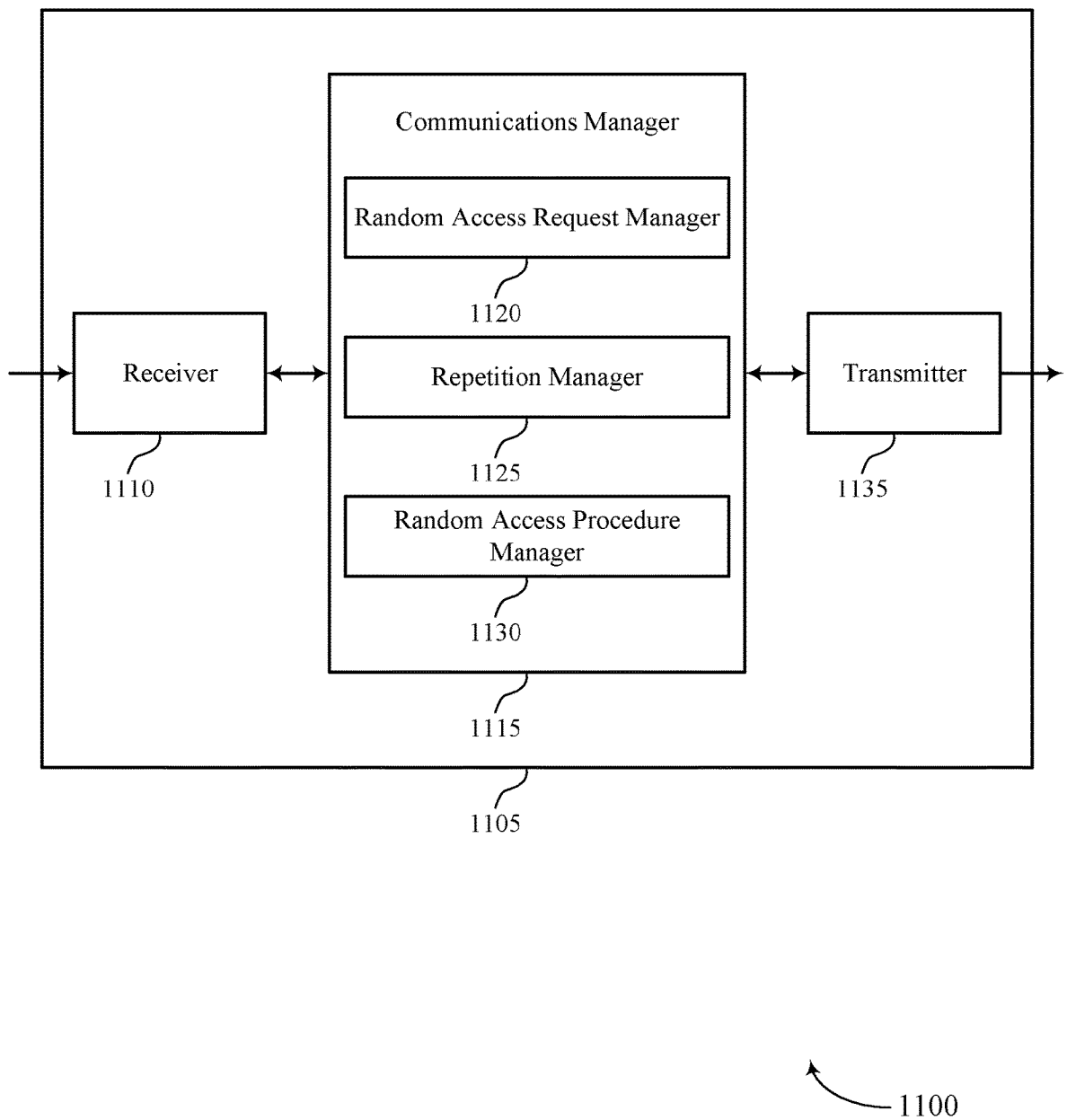

FIG. 11 shows a block diagram 1100 of a device 1105 that supports message repetition for a random access procedure based on a random access procedure format in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to message repetition for random access procedure based on a random access procedure format, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a random access request manager 1120, a repetition manager 1125, and a random access procedure manager 1130. The communications manager 1115 may be an example of aspects of the communications manager 1310 described herein.

The random access request manager 1120 may receive, from a UE, a random access request of a random access procedure and identify that the random access request is a first type of random access request from a set of types of random access request.

The repetition manager 1125 may determine, based on the random access request being the first type of random access request, a repetition pattern for a time window for communicating an RAR, the repetition pattern indicating at least a subset of slots of a set of slots of the time window, the set of slots for repeatedly providing at least a portion of the RAR to the UE.

The random access procedure manager 1130 may transmit the portion of the RAR in each slot of the subset of slots according to the repetition pattern.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
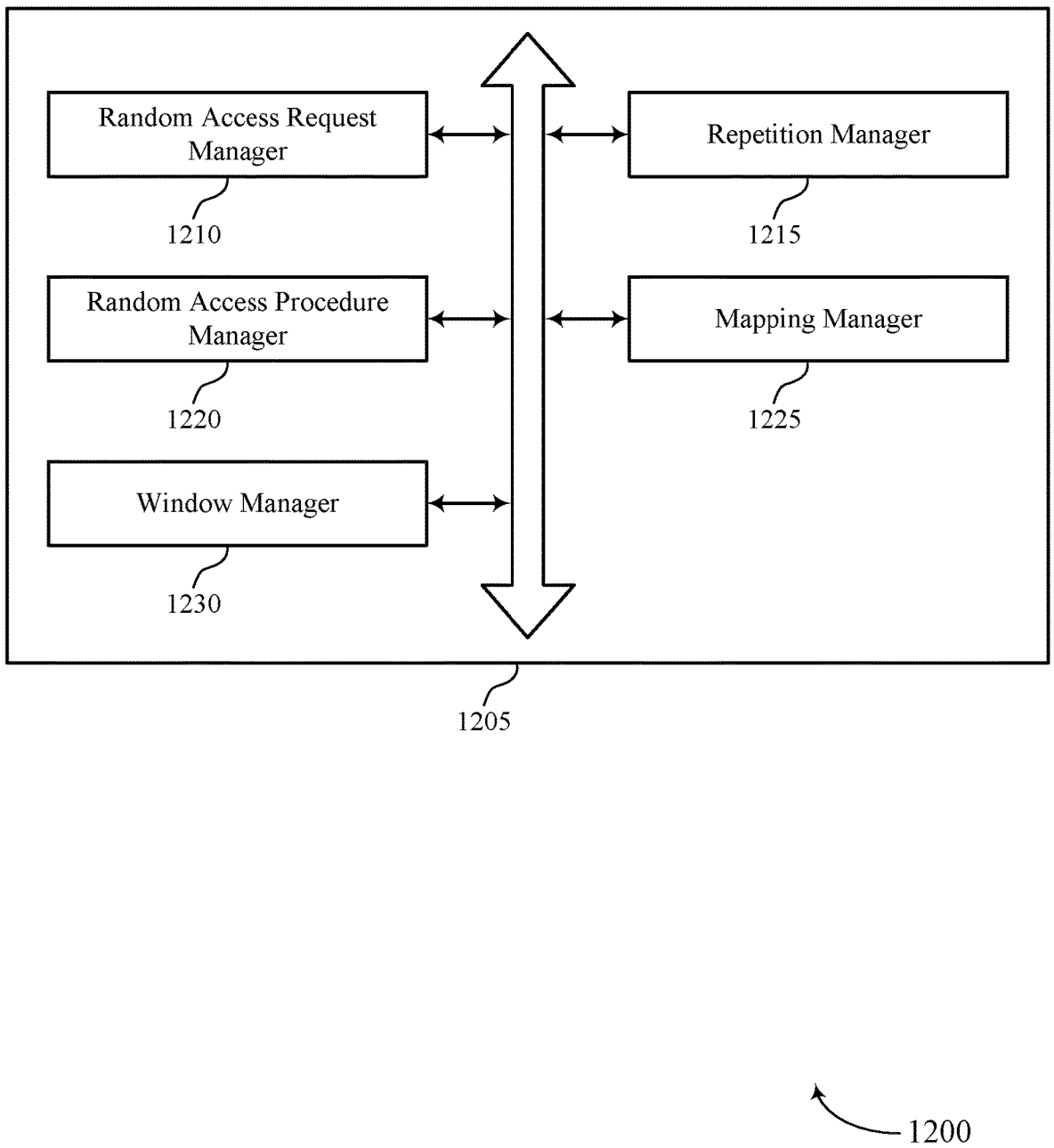
FIG. 12 shows a block diagram of a communications manager that supports message repetition for a random access procedure based on a random access procedure format in accordance with aspects of the present disclosure.

FIG. 12 shows a block diagram 1200 of a communications manager 1205 that supports message repetition for a random access procedure based on a random access procedure format in accordance with aspects of the present disclosure. The communications manager 1205 may be an example of aspects of a communications manager 1015, a communications manager 1115, or a communications manager 1310 described herein. The communications manager 1205 may include a random access request manager 1210, a repetition manager 1215, a random access procedure manager 1220, a mapping manager 1225, and a window manager 1230. Each of these modules may communicate, directly or indirectly, with one another (e.g., via one or more buses).

The random access request manager 1210 may receive, from a UE, a random access request of a random access procedure. In some examples, the random access request manager 1210 may identify that the random access request is a first type of random access request from a set of types of random access request. In some examples, the random access request manager 1210 may identify, from a set of formats of random access request, a first format of the first type of random access request, where each of the set of types of random access request is a different one of a set of formats of the random access request, and the first type of random access request is the first format of the set of formats.

In some examples, the random access request manager 1210 may identify, from a set of sets of resources of a random access channel, a set of resources of the random access channel used to receive the random access request, the set of resources corresponding to the first type of random access request. In some examples, the random access request manager 1210 may transmit, to the UE, an indication of the set of types of random access request via an MIB or an RMSI, or a combination thereof.

In some cases, the set of formats of the random access request include a set of different preambles. In some cases, the set of different preambles include at least a first preamble having a first length and a second preamble having a second length different from the first length.

The repetition manager 1215 may determine, based on the random access request being the first type of random access request, a repetition pattern for a time window for communicating an RAR, the repetition pattern indicating at least a subset of slots of a set of slots of the time window, the set of slots for repeatedly providing at least a portion of the RAR to the UE. In some examples, the repetition manager 1215 may determine the repetition pattern based on the identified mapping indicating that the first type of random access request corresponds to the repetition pattern.

In some cases, the portion of the RAR includes control information in a control channel. In some cases, the control channel includes a PDCCH. In some cases, the portion of the RAR includes control information or data in a shared channel. In some cases, the shared channel includes a PDSCH. In some cases, the repetitions of the portion of the RAR include similar or identical copies of the portion of the RAR.

The random access procedure manager 1220 may transmit the portion of the RAR in each slot of the subset of slots according to the repetition pattern. In some examples, the random access procedure manager 1220 may transmit the portion of the RAR in at least the subset of slots of the set of slots according to the repetition pattern in a first portion of the time window for communicating the RAR.

In some cases, the received random access request is a message A (or msgA) of the random access procedure, and the transmitted RAR is a message B (or msgB) of the random access procedure. In some cases, the received random access request is a message 1 (or msg1) of the random access procedure, and the transmitted RAR is a message 2 (or msg2) of the random access procedure.

The mapping manager 1225 may identify a mapping between the set of types of random access request and a set of repetition patterns for receiving instances of at least the portion of the RAR in the set of slots. In some examples, the mapping manager 1225 may transmit, to the UE, an indication of the mapping in one or more of an MIB or an RMSI, or a combination thereof.

The window manager 1230 may transmit, to the UE, an indication of the first portion of the time window and the second portion of the time window via a bit in a bitfield of an RMSI.

In some cases, the first portion of the time window for communicating the RAR is preceded by a second portion of the time window for communicating the RAR, the second portion of the time window configured for providing an instance of the portion of the RAR without repetition.

Figure 13:
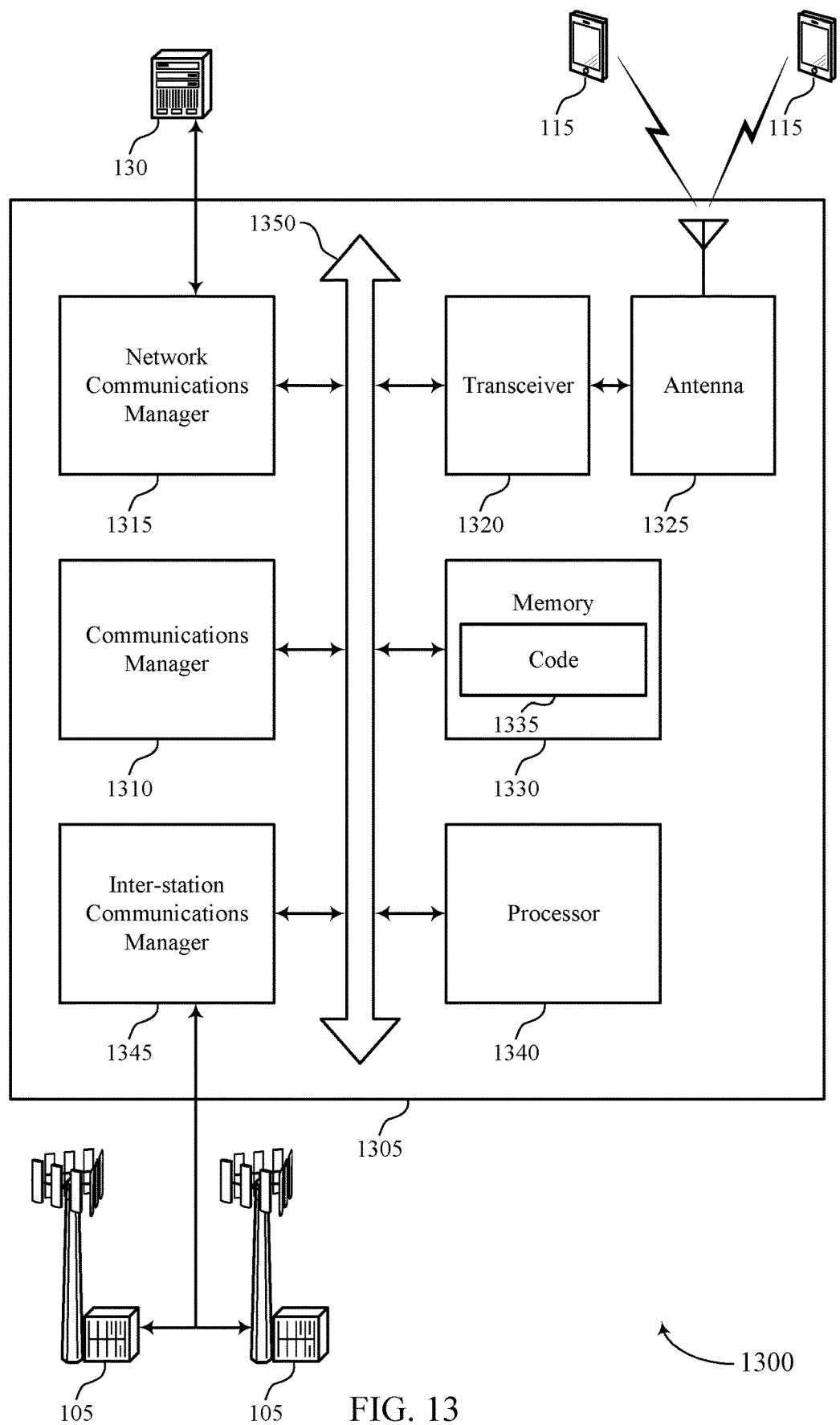
FIG. 13 shows a diagram of a system including a device that supports message repetition for a random access procedure based on a random access procedure format in accordance with aspects of the present disclosure.

FIG. 13 shows a diagram of a system 1300 including a device 1305 that supports message repetition for a random access procedure based on a random access procedure format in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive, from a UE, a random access request of a random access procedure, identify that the random access request is a first type of random access request from a set of types of random access request, determine, based on the random access request being the first type of random access request, a repetition pattern for a time window for communicating an RAR, the repetition pattern indicating at least a subset of slots of a set of slots of the time window, the set of slots for repeatedly providing at least a portion of the RAR to the UE, and transmit the portion of the RAR in each slot of the subset of slots according to the repetition pattern.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting message repetition for random access procedure based on a random access procedure format).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
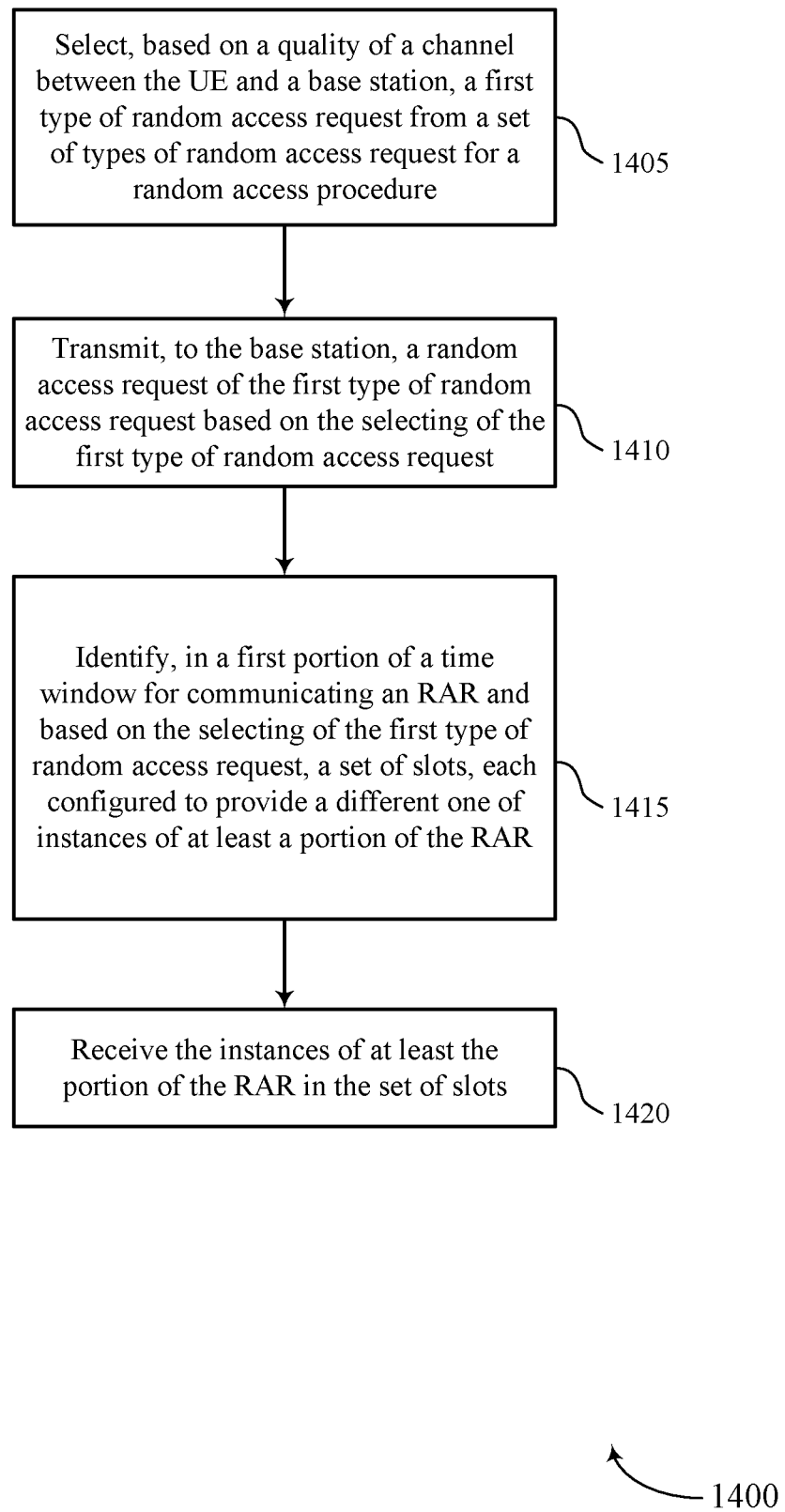
FIGS. 14 through 21 show flowcharts illustrating methods that support message repetition for a random access procedure based on a random access procedure format in accordance with aspects of the present disclosure.

FIG. 14 shows a flowchart illustrating a method 1400 that supports message repetition for a random access procedure based on a random access procedure format in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may select, based on a quality of a channel between the UE and a base station, a first type of random access request from a set of types of random access request for a random access procedure. The operations of 1405 may be performed according to the methods described herein. In some examples, aspects of the operations of 1405 may be performed by a random access request manager as described with reference to FIGS. 6 through 9.

At 1410, the UE may transmit, to the base station, a random access request of the first type of random access request based on the selecting of the first type of random access request. The operations of 1410 may be performed according to the methods described herein. In some examples, aspects of the operations of 1410 may be performed by a random access procedure manager as described with reference to FIGS. 6 through 9.

At 1415, the UE may identify, in a first portion of a time window for communicating an RAR and based on the selecting of the first type of random access request, a set of slots, each configured to provide a different one of instances of at least a portion of the RAR. The operations of 1415 may be performed according to the methods described herein. In some examples, aspects of the operations of 1415 may be performed by a repetition manager as described with reference to FIGS. 6 through 9.

At 1420, the UE may receive the instances of at least the portion of the RAR in the set of slots. The operations of 1420 may be performed according to the methods described herein. In some examples, aspects of the operations of 1420 may be performed by a random access procedure manager as described with reference to FIGS. 6 through 9.

Figure 15:
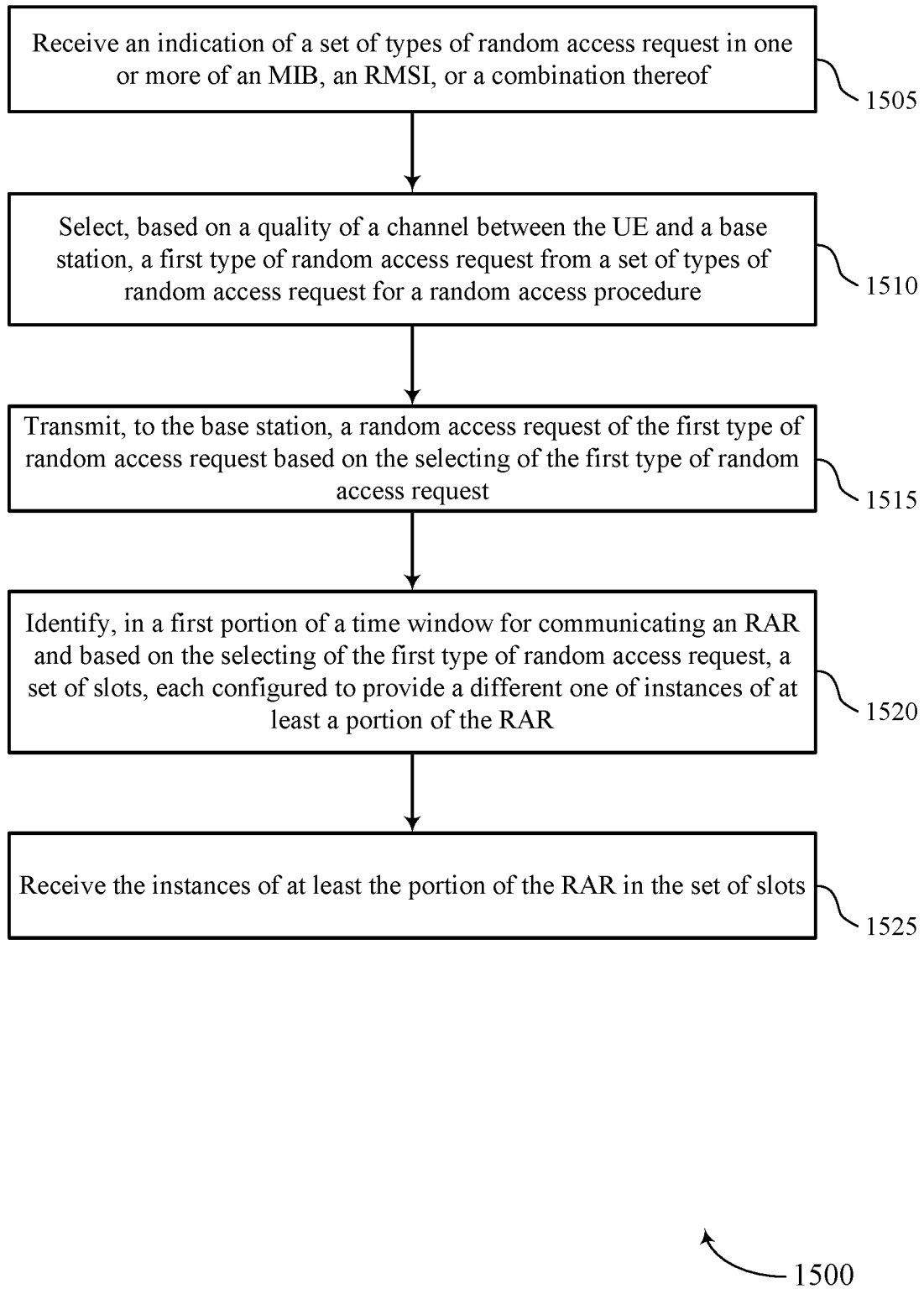

FIG. 15 shows a flowchart illustrating a method 1500 that supports message repetition for a random access procedure based on a random access procedure format in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive an indication of a set of types of random access request in one or more of an MIB, an RMSI, or a combination thereof. The operations of 1505 may be performed according to the methods described herein. In some examples, aspects of the operations of 1505 may be performed by a random access request manager as described with reference to FIGS. 6 through 9.

At 1510, the UE may select, based on a quality of a channel between the UE and a base station, a first type of random access request from a set of types of random access request for a random access procedure. The operations of 1510 may be performed according to the methods described herein. In some examples, aspects of the operations of 1510 may be performed by a random access request manager as described with reference to FIGS. 6 through 9.

At 1515, the UE may transmit, to the base station, a random access request of the first type of random access request based on the selecting of the first type of random access request. The operations of 1515 may be performed according to the methods described herein. In some examples, aspects of the operations of 1515 may be performed by a random access procedure manager as described with reference to FIGS. 6 through 9.

At 1520, the UE may identify, in a first portion of a time window for communicating an RAR and based on the selecting of the first type of random access request, a set of slots, each configured to provide a different one of instances of at least a portion of the RAR. The operations of 1520 may be performed according to the methods described herein. In some examples, aspects of the operations of 1520 may be performed by a repetition manager as described with reference to FIGS. 6 through 9.

At 1525, the UE may receive the instances of at least the portion of the RAR in the set of slots. The operations of 1525 may be performed according to the methods described herein. In some examples, aspects of the operations of 1525 may be performed by a random access procedure manager as described with reference to FIGS. 6 through 9.

Figure 16:
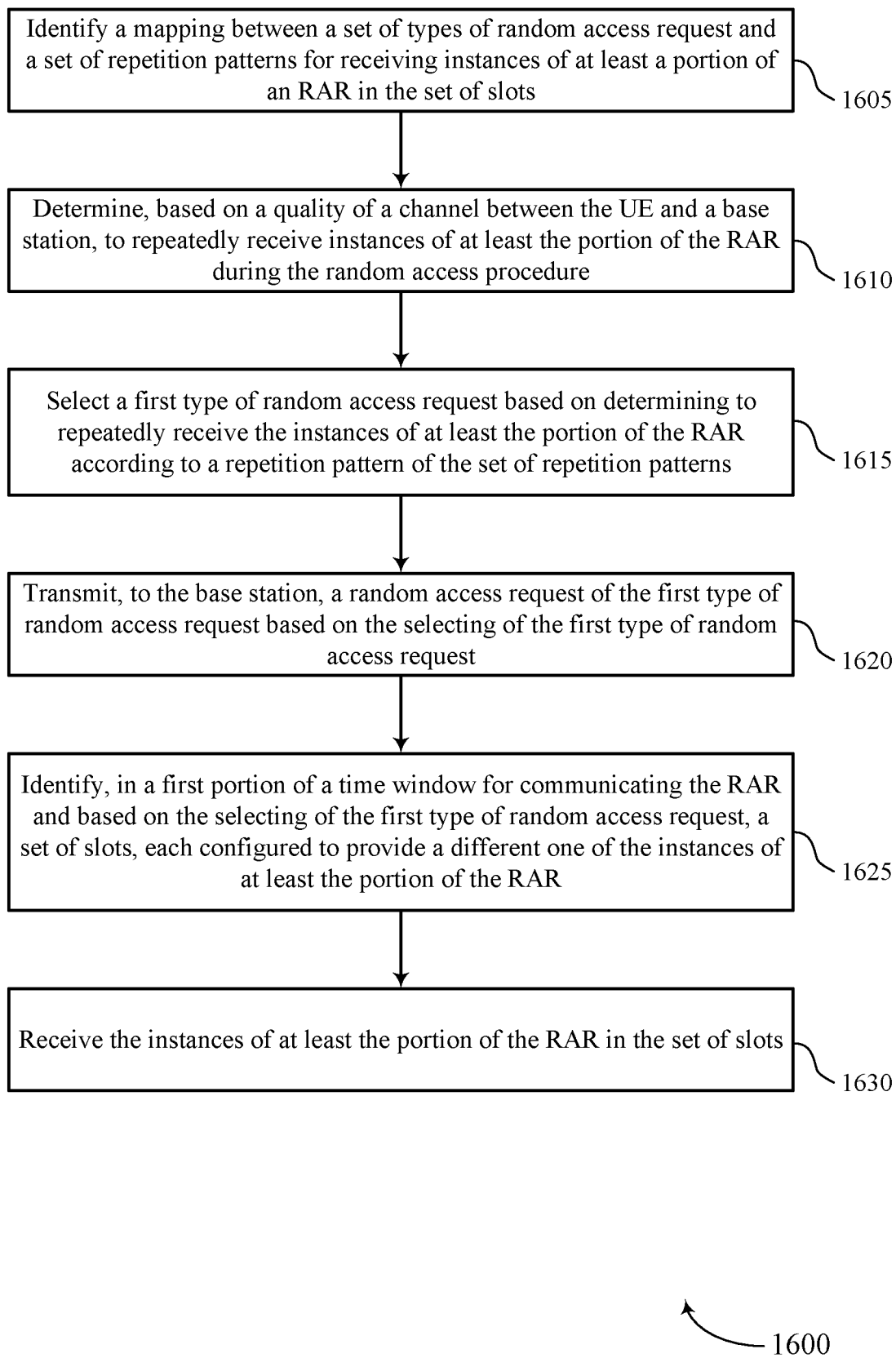

FIG. 16 shows a flowchart illustrating a method 1600 that supports message repetition for a random access procedure based on a random access procedure format in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may identify a mapping between a set of types of random access request and a set of repetition patterns for receiving instances of at least a portion of an RAR in the set of slots. The operations of 1605 may be performed according to the methods described herein. In some examples, aspects of the operations of 1605 may be performed by a mapping manager as described with reference to FIGS. 6 through 9.

At 1610, the UE may determine, based on a quality of a channel between the UE and base station, to repeatedly receive instances of at least the portion of an RAR during the random access procedure. The operations of 1610 may be performed according to the methods described herein. In some examples, aspects of the operations of 1610 may be performed by a repetition manager as described with reference to FIGS. 6 through 9.

At 1615, the UE may select a first type of random access request based on determining to repeatedly receive the instances of at least the portion of the RAR according to a repetition pattern of the set of repetition patterns. The operations of 1615 may be performed according to the methods described herein. In some examples, aspects of the operations of 1615 may be performed by a random access request manager as described with reference to FIGS. 6 through 9.

At 1620, the UE may transmit, to the base station, a random access request of the first type of random access request based on the selecting of the first type of random access request. The operations of 1620 may be performed according to the methods described herein. In some examples, aspects of the operations of 1620 may be performed by a random access procedure manager as described with reference to FIGS. 6 through 9.

At 1625, the UE may identify, in a first portion of a time window for communicating the RAR and based on the selecting the first type of random access request, a set of slots, each configured to provide a different one of the instances of at least the portion of the RAR. The operations of 1625 may be performed according to the methods described herein. In some examples, aspects of the operations of 1625 may be performed by a repetition manager as described with reference to FIGS. 6 through 9.

At 1630, the UE may receive the instances of at least the portion of the RAR in the set of slots. The operations of 1630 may be performed according to the methods described herein. In some examples, aspects of the operations of 1630 may be performed by a random access procedure manager as described with reference to FIGS. 6 through 9.

Figure 17:
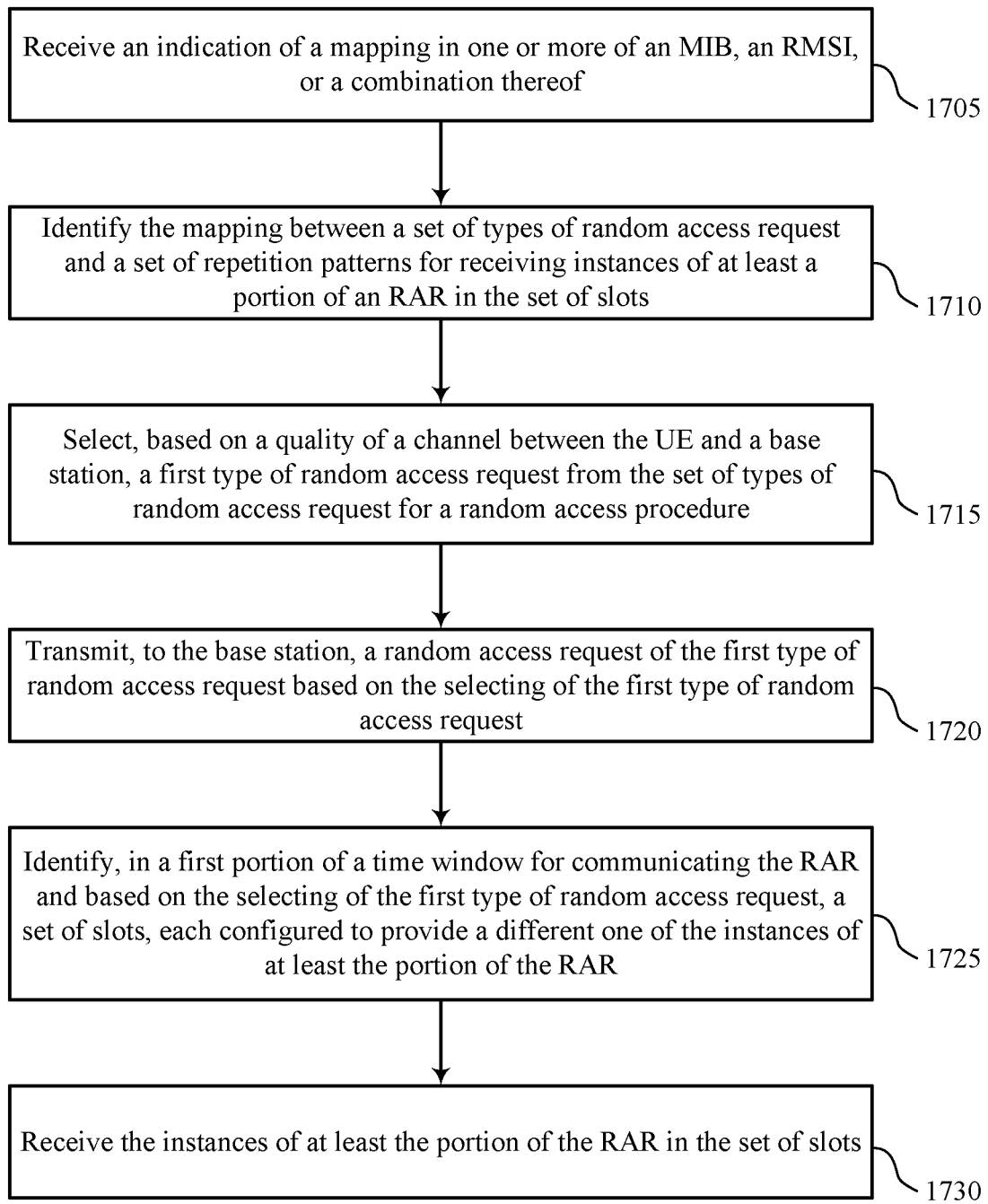

FIG. 17 shows a flowchart illustrating a method 1700 that supports message repetition for a random access procedure based on a random access procedure format in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1705, the UE may receive an indication of a mapping in one or more of an MIB, an RMSI, or a combination thereof. The operations of 1705 may be performed according to the methods described herein. In some examples, aspects of the operations of 1705 may be performed by a mapping manager as described with reference to FIGS. 6 through 9.

At 1710, the UE may identify the mapping between a set of types of random access request and a set of repetition patterns for receiving instances of at least a portion of an RAR in the set of slots. The operations of 1710 may be performed according to the methods described herein. In some examples, aspects of the operations of 1710 may be performed by a mapping manager as described with reference to FIGS. 6 through 9.

At 1715, the UE may select, based on a quality of a channel between the UE and a base station, a first type of random access request from the set of types of random access request for a random access procedure. The operations of 1715 may be performed according to the methods described herein. In some examples, aspects of the operations of 1715 may be performed by a random access request manager as described with reference to FIGS. 6 through 9.

At 1720, the UE may transmit, to the base station, a random access request of the first type of random access request based on the selecting of the first type of random access request. The operations of 1720 may be performed according to the methods described herein. In some examples, aspects of the operations of 1720 may be performed by a random access procedure manager as described with reference to FIGS. 6 through 9.

At 1725, the UE may identify, in a first portion of a time window for communicating the RAR and based on the selecting of the first type of random access request, a set of slots, each configured to provide a different one of the instances of at least the portion of the RAR. The operations of 1725 may be performed according to the methods described herein. In some examples, aspects of the operations of 1725 may be performed by a repetition manager as described with reference to FIGS. 6 through 9.

At 1730, the UE may receive the instances of at least the portion of the RAR in the set of slots. The operations of 1730 may be performed according to the methods described herein. In some examples, aspects of the operations of 1730 may be performed by a random access procedure manager as described with reference to FIGS. 6 through 9.

Figure 18:
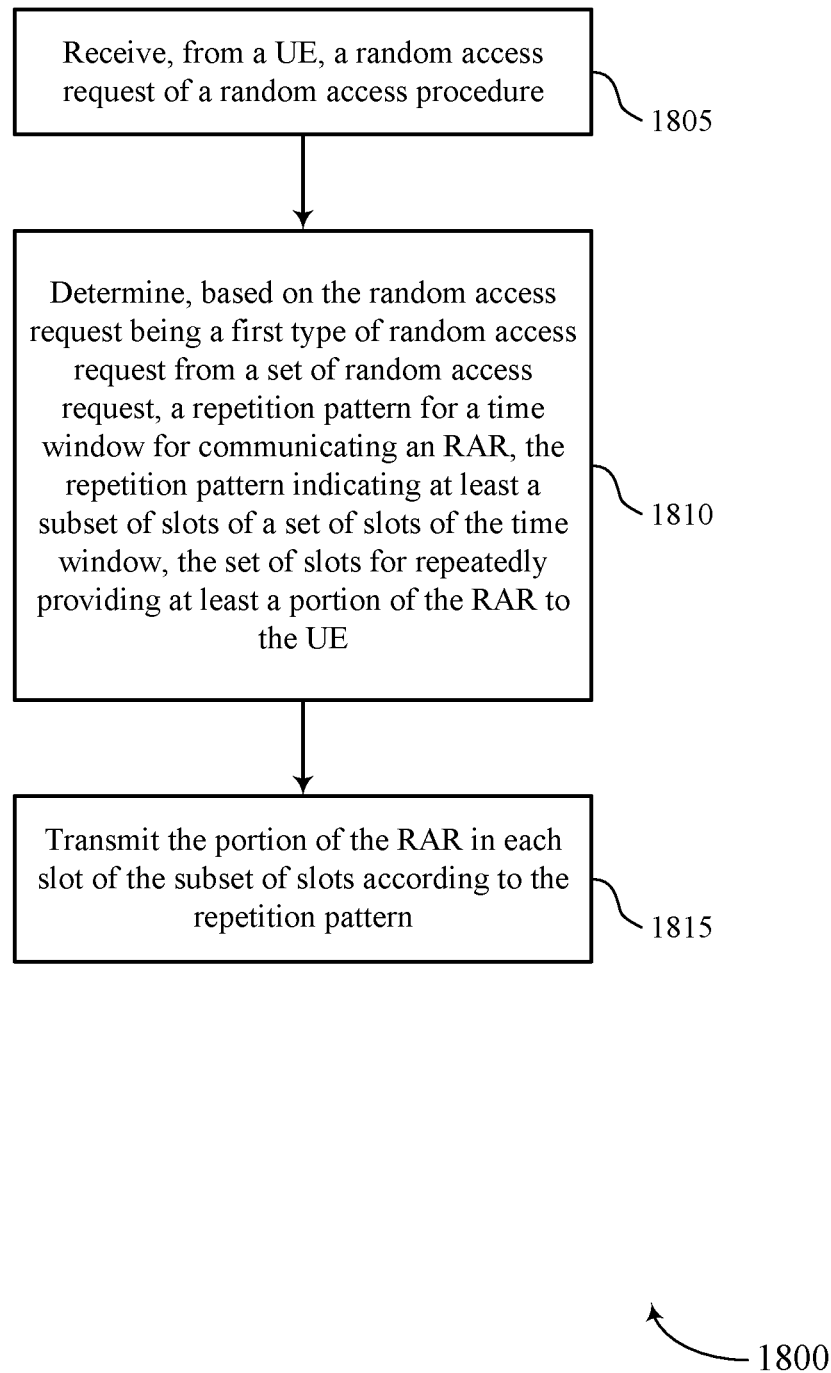

FIG. 18 shows a flowchart illustrating a method 1800 that supports message repetition for a random access procedure based on a random access procedure format in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may receive, from a UE, a random access request of a random access procedure. The operations of 1805 may be performed according to the methods described herein. In some examples, aspects of the operations of 1805 may be performed by a random access request manager as described with reference to FIGS. 10 through 13.

At 1810, the base station may determine, based on the random access request being a first type of random access request from a set of random access requests, a repetition pattern for a time window for communicating an RAR, the repetition pattern indicating at least a subset of slots of a set of slots of the time window, the set of slots for repeatedly providing at least a portion of the RAR to the UE. The operations of 1810 may be performed according to the methods described herein. In some examples, aspects of the operations of 1810 may be performed by a repetition manager as described with reference to FIGS. 10 through 13.

At 1820, the base station may transmit the portion of the RAR in each slot of the subset of slots according to the repetition pattern. The operations of 1820 may be performed according to the methods described herein. In some examples, aspects of the operations of 1820 may be performed by a random access procedure manager as described with reference to FIGS. 10 through 13.

Figure 19:
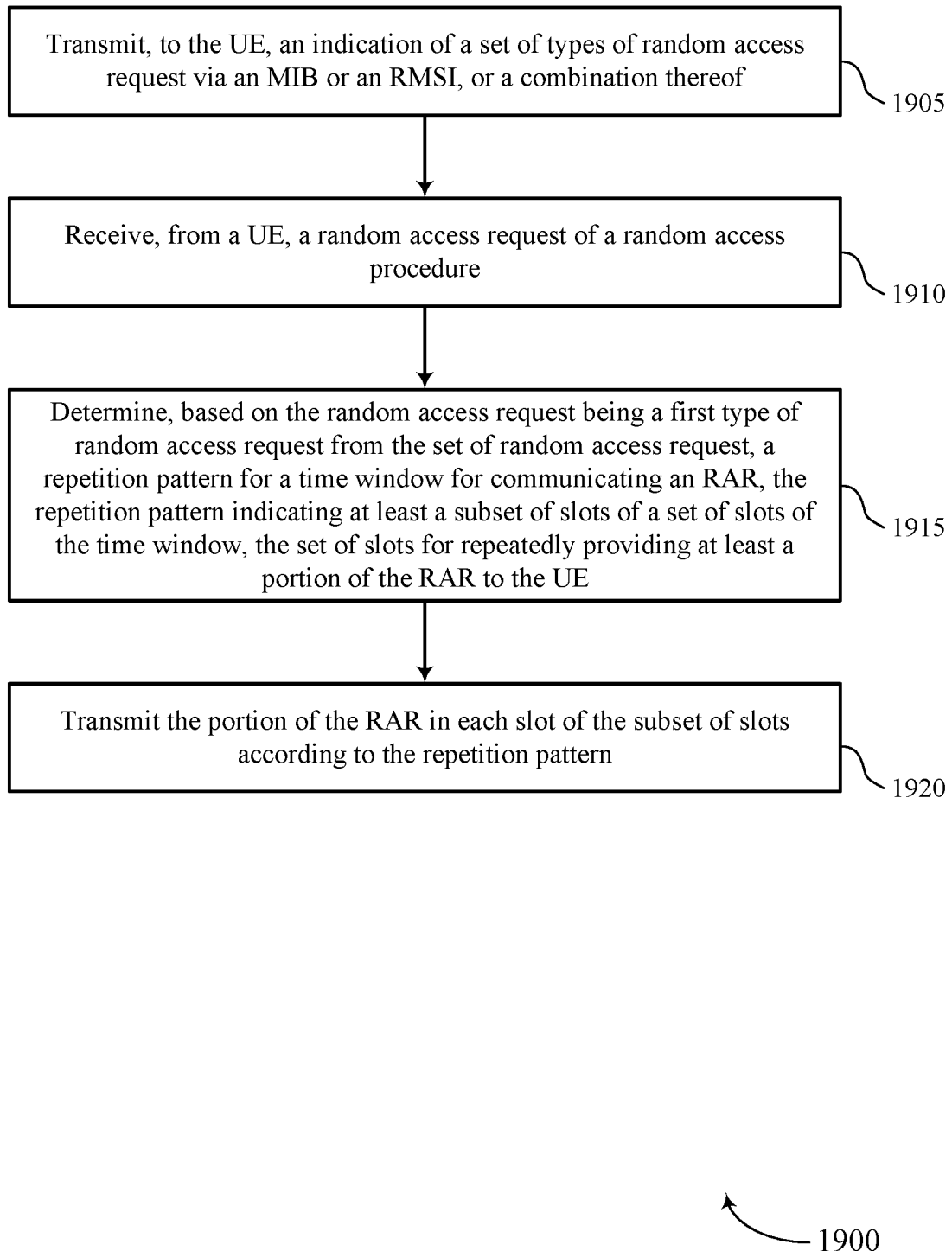

FIG. 19 shows a flowchart illustrating a method 1900 that supports message repetition for a random access procedure based on a random access procedure format in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1905, the base station may transmit, to the UE, an indication of a set of types of random access request via an MIB or an RMSI, or a combination thereof. The operations of 1905 may be performed according to the methods described herein. In some examples, aspects of the operations of 1905 may be performed by a random access request manager as described with reference to FIGS. 10 through 13.

At 1910, the base station may receive, from a UE, a random access request of a random access procedure. The operations of 1910 may be performed according to the methods described herein. In some examples, aspects of the operations of 1910 may be performed by a random access request manager as described with reference to FIGS. 10 through 13.

At 1915, the base station may determine, based on the random access request being a first type of random access request from the set of types of random access request, a repetition pattern for a time window for communicating an RAR, the repetition pattern indicating at least a subset of slots of a set of slots of the time window, the set of slots for repeatedly providing at least a portion of the RAR to the UE. The operations of 1915 may be performed according to the methods described herein. In some examples, aspects of the operations of 1915 may be performed by a repetition manager as described with reference to FIGS. 10 through 13.

At 1920, the base station may transmit the portion of the RAR in each slot of the subset of slots according to the repetition pattern. The operations of 1920 may be performed according to the methods described herein. In some examples, aspects of the operations of 1920 may be performed by a random access procedure manager as described with reference to FIGS. 10 through 13.

Figure 20:
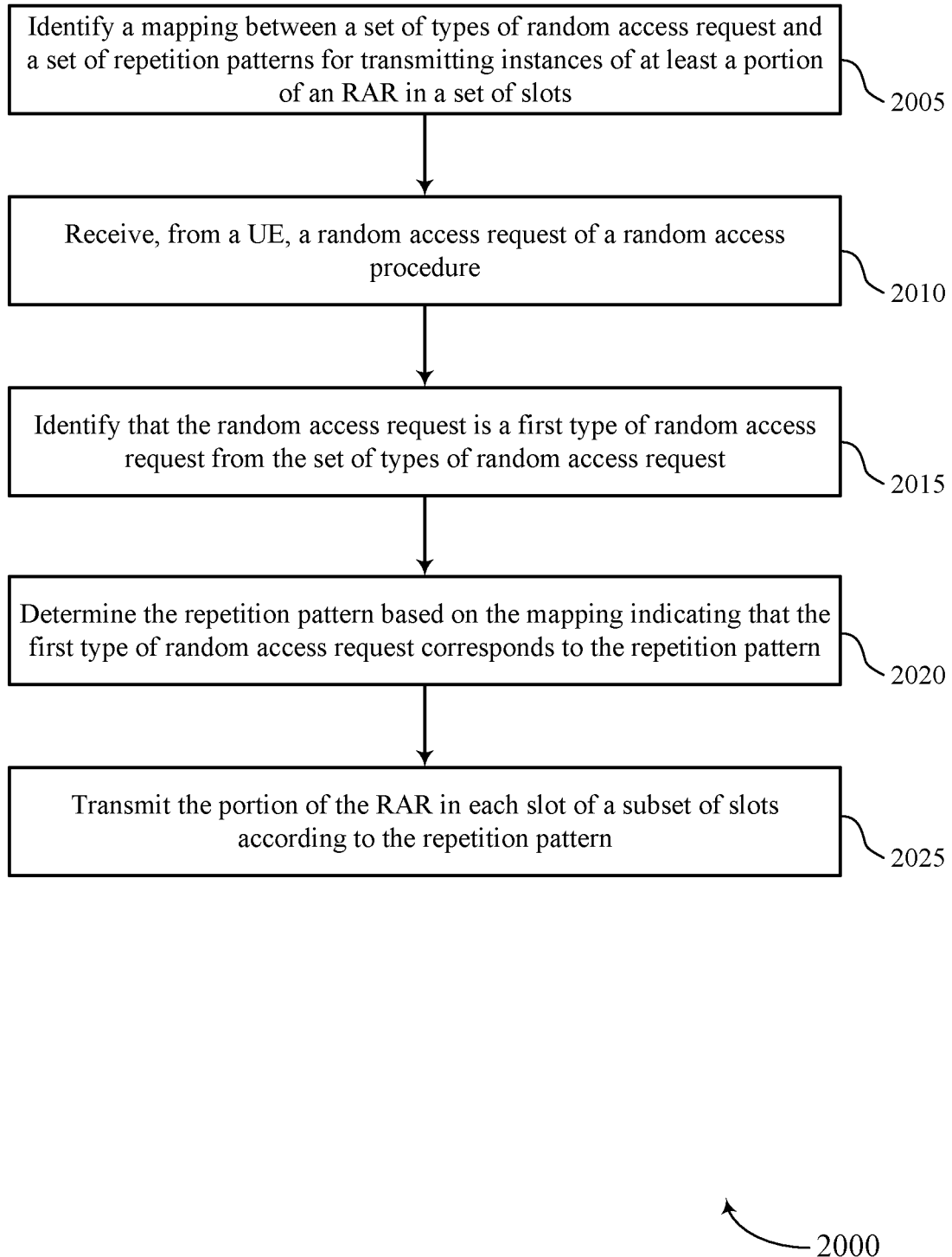

FIG. 20 shows a flowchart illustrating a method 2000 that supports message repetition for a random access procedure based on a random access procedure format in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2005, the base station may identify a mapping between a set of types of random access request and a set of repetition patterns for transmitting instances of at least a portion of an RAR in a set of slots. The operations of 2005 may be performed according to the methods described herein. In some examples, aspects of the operations of 2005 may be performed by a mapping manager as described with reference to FIGS. 10 through 13.

At 2010, the base station may receive, from a UE, a random access request of a random access procedure. The operations of 2010 may be performed according to the methods described herein. In some examples, aspects of the operations of 2010 may be performed by a random access request manager as described with reference to FIGS. 10 through 13.

At 2015, the base station may identify that the random access request is a first type of random access request from the set of types of random access request. The operations of 2015 may be performed according to the methods described herein. In some examples, aspects of the operations of 2015 may be performed by a random access request manager as described with reference to FIGS. 10 through 13.

At 2020, the base station may determine the repetition pattern based on the mapping indicating that the first type of random access request corresponds to the repetition pattern. The operations of 2020 may be performed according to the methods described herein. In some examples, aspects of the operations of 2020 may be performed by a repetition manager as described with reference to FIGS. 10 through 13.

At 2025, the base station may transmit the portion of the RAR in each slot of a subset of slots according to the repetition pattern. The operations of 2025 may be performed according to the methods described herein. In some examples, aspects of the operations of 2025 may be performed by a random access procedure manager as described with reference to FIGS. 10 through 13.

Figure 21:
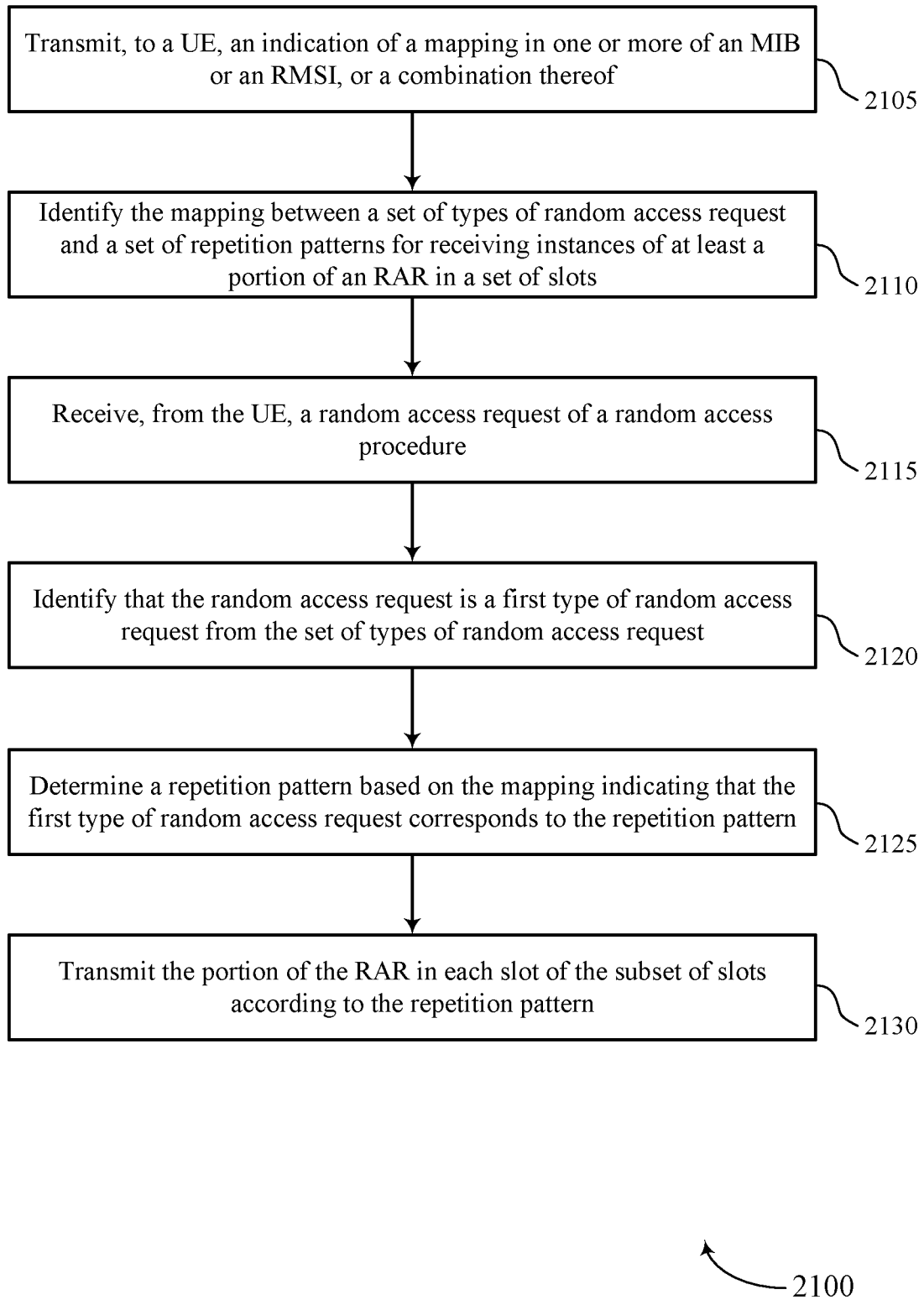

FIG. 21 shows a flowchart illustrating a method 2100 that supports message repetition for a random access procedure based on a random access procedure format in accordance with aspects of the present disclosure. The operations of method 2100 may be implemented by a base station 105 or its components as described herein. For example, the operations of method 2100 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2105, the base station may transmit, to a UE, an indication of a mapping in one or more of an MIB or an RMSI, or a combination thereof. The operations of 2105 may be performed according to the methods described herein. In some examples, aspects of the operations of 2105 may be performed by a mapping manager as described with reference to FIGS. 10 through 13.

At 2110, the base station may identify the mapping between a set of types of random access request and a set of repetition patterns for receiving instances of at least a portion of an RAR in a set of slots. The operations of 2110 may be performed according to the methods described herein. In some examples, aspects of the operations of 2110 may be performed by a mapping manager as described with reference to FIGS. 10 through 13.

At 2115, the base station may receive, from the UE, a random access request of a random access procedure. The operations of 2115 may be performed according to the methods described herein. In some examples, aspects of the operations of 2115 may be performed by a random access request manager as described with reference to FIGS. 10 through 13.

At 2120, the base station may identify that the random access request is a first type of random access request from the set of types of random access request. The operations of 2120 may be performed according to the methods described herein. In some examples, aspects of the operations of 2120 may be performed by a random access request manager as described with reference to FIGS. 10 through 13.

At 2125, the base station may determine a repetition pattern based on the mapping indicating that the first type of random access request corresponds to the repetition pattern. The operations of 2125 may be performed according to the methods described herein. In some examples, aspects of the operations of 2125 may be performed by a repetition manager as described with reference to FIGS. 10 through 13.

At 2130, the base station may transmit the portion of the RAR in each slot of the subset of slots according to the repetition pattern. The operations of 2130 may be performed according to the methods described herein. In some examples, aspects of the operations of 2130 may be performed by a random access procedure manager as described with reference to FIGS. 10 through 13.

The following provides an overview of aspects of the present disclosure:

Aspect 1: A method for wireless communication at a UE, comprising: selecting, based at least in part on a quality of a channel between the UE and a base station, a first type of random access request from a plurality of types of random access request for a random access procedure; transmitting, to the base station, a random access request of the first type of random access request based at least in part on the selecting of the first type of random access request; identifying, in a first portion of a time window for communicating an RAR and based at least in part on the selecting of the first type of random access request, a plurality of slots, each configured to provide a different one of instances of at least a portion of the RAR; and receiving the instances of at least the portion of the RAR in the plurality of slots.

Aspect 2: The method of aspect 1, wherein each of the plurality of types of random access request is associated with a different repetition pattern for transmitting the random access request.

Aspect 3: The method of any of aspects 1 through 2, wherein the first type of random access request is for transmitting the random access request with repetition and a second type of random access request of the plurality of types of random access request is for transmitting the random access request without repetition.

Aspect 4: The method of any of aspects 1 through 3, wherein the selecting of the first type of random access request comprises: identifying a mapping between the plurality of types of random access request and a set of repetition patterns for the receiving of the instances of at least the portion of the RAR in the plurality of slots; and selecting the first type of random access request to repeatedly receive the instances of at least the portion of the RAR according to a repetition pattern of the set of repetition patterns.

Aspect 5: The method of aspect 4, wherein the mapping indicates a correspondence between the transmitting of the random access request with repetition and the receiving of the instances of at least the portion of the RAR according to the repetition pattern.

Aspect 6: The method of any of aspects 4 through 5, further comprising: receiving an indication of the mapping in one or more of an MIB, an RMSI, or a combination thereof.

Aspect 7: The method of any of aspects 1 through 6, wherein each type of the plurality of types of random access request is associated with a different subset of preamble sequences of a plurality of preamble sequences.

Aspect 8: The method of any of aspects 1 through 7, wherein each type of the plurality of types of random access request is a different one of a plurality of formats of the random access request, the first type of random access request is a first format of the plurality of formats.

Aspect 9: The method of aspect 8, wherein the plurality of formats of the random access request comprise a plurality of different preambles.

Aspect 10: The method of aspect 9, wherein the plurality of different preambles comprise at least a first preamble having a first length and a second preamble having a second length different from the first length.

Aspect 11: The method of any of aspects 1 through 10, wherein each type of the plurality of types of random access request is associated with a different set of resources of a plurality of sets of resources.

Aspect 12: The method of any of aspects 1 through 11, further comprising: receiving an indication of the plurality of types of random access request in one or more of an MIB, an RMSI, or a combination thereof.

Aspect 13: The method of any of aspects 1 through 12, wherein the receiving of the instances comprises: monitoring, during the first portion of the time window, the plurality of slots for the instances of at least the portion of the RAR based at least in part on identifying that the random access procedure is operating within the first portion of the time window; combining the instances of at least the portion of the RAR identified from monitoring the plurality of slots;

and decoding the RAR received as part of the random access procedure based at least in part on the combining of the instances.

Aspect 14: The method of aspect 13, further comprising: performing a parity check on the combination of the instances, wherein the decoding of the RAR is based at least in part on the performing of the parity check.

Aspect 15: The method of any of aspects 1 through 14, wherein the instances comprise control information in a control channel.

Aspect 16: The method of aspect 15, wherein the control channel comprises a PDCCH.

Aspect 17: The method of any of aspects 1 through 14, wherein the instances comprise control information or data in a shared channel.

Aspect 18: The method of aspect 17, wherein the shared channel comprises a PDSCH.

Aspect 19: The method of any of aspects 1 through 18, further comprising: receiving one or more SSBs; and determining one or both of a received power or a received quality for the one or more SSBs, wherein the quality of the channel is based at least in part on the one more of the received power or the received quality for the one or more SSBs.

Aspect 20: The method of any of aspects 1 through 19, further comprising: determining the quality of the channel associated with a random access channel; comparing the quality of the channel with a quality threshold; and selecting the first type of random access request based at least in part on the quality satisfying the quality threshold, wherein the first type of random access request is associated with a first quantity of repetitions of the instances of at least the portion of the RAR, and a second type of random access request of the plurality of types of random access request is associated with a second quantity of repetitions of the instances of at least the portion of the RAR, wherein the first quantity of repetitions is less than the second quantity of repetitions of the instances.

Aspect 21: The method of any of aspects 1 through 19, further comprising: determining the quality of the channel associated with a random access channel; comparing the quality of the channel with a quality threshold; and selecting the first type of random access request based at least in part on the quality failing to satisfy the quality threshold, wherein the first type of random access request is associated with a first quantity of repetitions of the instances of at least the portion of the RAR, and a second type of random access request of the plurality of types of random access request is associated with a second quantity of repetitions of the instances of at least the portion of the RAR, wherein the first quantity of repetitions is greater than the second quantity of repetitions of the instances.

Aspect 22: The method of any of aspects 1 through 21, wherein the first portion of the time window for the communicating of the RAR is preceded by a second portion of the time window for communicating the RAR, the second portion of the time window configured for providing an instance of at least the portion of the RAR without repetition.

Aspect 23: The method of aspect 22, further comprising: receiving, from the base station, an indication of the first portion of the time window and the second portion of the time window via a bit in a bitfield of an RMSI.

Aspect 24: The method of any of aspects 1 through 23, wherein the instances comprise similar or identical copies of at least the portion of the RAR.

Aspect 25: The method of any of aspects 1 through 24, wherein the random access request is a message A (or msgA) of the random access procedure, and the RAR is a message B (or msgB) of the random access procedure.

Aspect 26: The method of any of aspects 1 through 24, wherein the random access request is a message 1 (msg1) of the random access procedure, and the RAR is a message 2 (msg2) of the random access procedure.

Aspect 27: A method for wireless communication at a base station, comprising: receiving, from a UE, a random access request of a random access procedure; determining, based at least in part on the random access request being a first type of random access request from a plurality of types of random access request, a repetition pattern for a time window for communicating an RAR, the repetition pattern indicating at least a subset of slots of a plurality of slots of the time window, the plurality of slots for repeatedly providing at least a portion of the RAR to the UE; and transmitting the portion of the RAR in each slot of the subset of slots according to the repetition pattern.

Aspect 28: The method of aspect 27, wherein each type of the plurality of types of random access request is associated with a different repetition pattern for transmitting the random access request, and the first type of random access request is for transmitting the random access request with repetition and a second type of random access request of the plurality of types of random access request is for transmitting the random access request without repetition.

Aspect 29: The method of any of aspects 27 through 28, wherein the determining of the repetition pattern comprises: identifying a mapping between the plurality of types of random access request and a set of repetition patterns for transmitting instances of at least the portion of the RAR in each slot of the subset of slots; and determining the repetition pattern based at least in part on the mapping indicating that the first type of random access request corresponds to the repetition pattern.

Aspect 30: The method of aspect 29, wherein the mapping indicates a correspondence between receiving the random access request with repetition and transmitting the instances of at least the portion of the RAR with repetition.

Aspect 31: The method of any of aspects 29 through 30, further comprising: transmitting, to the UE, an indication of the mapping in one or more of an MIB or an RMSI, or a combination thereof.

Aspect 32: The method of any of aspects 27 through 31, wherein each type of the plurality of types of random access request is a different one of a plurality of formats of the random access request, and the first type of random access request is a first format of the plurality of formats.

Aspect 33: The method of aspect 32, wherein the plurality of formats of the random access request comprise a plurality of different preambles.

Aspect 34: The method of aspect 33, wherein the plurality of different preambles comprise at least a first preamble having a first length and a second preamble having a second length different from the first length.

Aspect 35: The method of any of aspects 27 through 34, wherein each type of the plurality of types of random access request is associated with a different set of resources of a plurality of sets of resources.

Aspect 36: The method of any of aspects 27 through 35, further comprising: transmitting, to the UE, an indication of the plurality of types of random access request via an MIB or an RMSI, or a combination thereof.

Aspect 37: The method of any of aspects 27 through 36, wherein the transmitting of the portion of the RAR in each slot of the subset of slots according to the repetition pattern further comprises: transmitting the portion of the RAR in at least the subset of slots according to the repetition pattern in a first portion of the time window for communicating the RAR.

Aspect 38: The method of aspect 37, wherein the first portion of the time window for communicating the RAR is preceded by a second portion of the time window for communicating the RAR, the second portion of the time window configured for providing an instance of the portion of the RAR without repetition.

Aspect 39: The method of aspect 38, further comprising: transmitting, to the UE, an indication of the first portion of the time window and the second portion of the time window via a bit in a bitfield of an RMSI.

Aspect 40: The method of any of aspects 27 through 39, wherein the portion of the RAR comprises control information in a control channel.

Aspect 41: The method of aspect 40, wherein the control channel comprises a PDCCH.

Aspect 42: The method of any of aspects 27 through 39, wherein the portion of the RAR comprises control information or data in a shared channel.

Aspect 43: The method of aspect 42, wherein the shared channel comprises a PDSCH.

Aspect 44: The method of any of aspects 27 through 43, wherein a number of repetitions of the portion of the RAR comprise similar or identical copies of the portion of the RAR.

Aspect 45: The method of any of aspects 27 through 44, wherein the random access request is a message A (or msgA) of the random access procedure, and the portion of the RAR is a message B (or msgB) of the random access procedure.

Aspect 46: The method of any of aspects 27 through 44, wherein the random access request is a message 1 (msg1) of the random access procedure, and the portion of the RAR is a message 2 (msg2) of the random access procedure.

Aspect 47: An apparatus for wireless communication at a UE, comprising a processor; memory coupled with the processor; and instructions stored in the memory and executable by the processor to cause the apparatus to perform a method of any of aspects 1 through 26.

Aspect 48: An apparatus for wireless communication at a UE, comprising at least one means for performing a method of any of aspects 1 through 26.

Aspect 49: A non-transitory computer-readable medium storing code for wireless communication at a UE, the code comprising instructions executable by a processor to perform a method of any of aspects 1 through 26.

Aspect 50: An apparatus for wireless communication at a base station, comprising a processor; memory coupled with the processor; and instructions stored in the memory and executable by the processor to cause the apparatus to perform a method of any of aspects 27 through 46.

Aspect 51: An apparatus for wireless communication at a base station, comprising at least one means for performing a method of any of aspects 27 through 46.

Aspect 52: A non-transitory computer-readable medium storing code for wireless communication at a base station, the code comprising instructions executable by a processor to perform a method of any of aspects 27 through 46.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   selecting, based at least in part on a quality of a channel between the UE and an access network entity, a first type of random access request from a plurality of types of random access request for a random access procedure;
   transmitting, to the access network entity, a random access request of the first type of random access request based at least in part on the selecting of the first type of random access request;
   identifying, in a first portion of a time window for communicating a random access response and based at least in part on the selecting of the first type of random access request, a plurality of slots, each configured to provide a different one of instances of at least a portion of the random access response; and
   receiving the instances of at least the portion of the random access response in the plurality of slots.

2. The method of claim 1, wherein each of the plurality of types of random access request is associated with a different repetition pattern for transmitting the random access request.

3. The method of claim 1, wherein the first type of random access request is for transmitting the random access request with repetition and a second type of random access request of the plurality of types of random access request is for transmitting the random access request without repetition.

4. The method of claim 1, wherein the selecting of the first type of random access request comprises:
   identifying a mapping between the plurality of types of random access request and a set of repetition patterns for the receiving of the instances of at least the portion of the random access response in the plurality of slots; and
   selecting the first type of random access request to repeatedly receive the instances of at least the portion of the random access response according to a repetition pattern of the set of repetition patterns.

5. The method of claim 4, wherein the mapping indicates a correspondence between the transmitting of the random access request with repetition and the receiving of the instances of at least the portion of the random access response according to the repetition pattern.

6. The method of claim 4, further comprising:
   receiving an indication of the mapping in one or more of a master information block (MIB), a remaining minimum system information (RMSI), or a combination thereof.

7. The method of claim 1, wherein each type of the plurality of types of random access request is associated with a different subset of preamble sequences of a plurality of preamble sequences.

8. The method of claim 1, wherein each type of the plurality of types of random access request is a different one of a plurality of formats of the random access request, wherein the first type of random access request is a first format of the plurality of formats.

9. The method of claim 8, wherein the plurality of formats of the random access request comprise a plurality of different preambles.

10. The method of claim 9, wherein the plurality of different preambles comprise at least a first preamble having a first length and a second preamble having a second length different from the first length.

11. The method of claim 1, wherein each type of the plurality of types of random access request is associated with a different set of resources of a plurality of sets of resources.

12. The method of claim 1, further comprising:
   receiving an indication of the plurality of types of random access request in one or more of a master information block (MIB), a remaining minimum system information (RMSI), or a combination thereof.

13. The method of claim 1, wherein the receiving of the instances comprises:
   monitoring, during the first portion of the time window, the plurality of slots for the instances of at least the portion of the random access response based at least in part on identifying that the random access procedure is operating within the first portion of the time window;

combining the instances of at least the portion of the random access response identified from monitoring the plurality of slots; and decoding the random access response received as part of the random access procedure based at least in part on the combining of the instances.

14. The method of claim 13, further comprising:
performing a parity check on the combination of the instances, wherein the decoding of the random access response is based at least in part on the performing of the parity check.

15. The method of claim 1, further comprising:
receiving one or more synchronization signal blocks; and
determining one or both of a received power or a received quality for the one or more synchronization signal blocks, wherein the quality of the channel is based at least in part on the one more of the received power or the received quality for the one or more synchronization signal blocks.

16. The method of claim 1, further comprising:
determining the quality of the channel associated with a random access channel;
comparing the quality of the channel with a quality threshold; and
selecting the first type of random access request based at least in part on the quality satisfying the quality threshold, wherein the first type of random access request is associated with a first quantity of repetitions of the instances of at least the portion of the random access response, and a second type of random access request of the plurality of types of random access request is associated with a second quantity of repetitions of the instances of at least the portion of the random access response, wherein the first quantity of repetitions is less than the second quantity of repetitions of the instances.

17. The method of claim 1, further comprising:
determining the quality of the channel associated with a random access channel;
comparing the quality of the channel with a quality threshold; and
selecting the first type of random access request based at least in part on the quality failing to satisfy the quality threshold, wherein the first type of random access request is associated with a first quantity of repetitions of the instances of at least the portion of the random access response, and a second type of random access request of the plurality of types of random access request is associated with a second quantity of repetitions of the instances of at least the portion of the random access response, wherein the first quantity of repetitions is greater than the second quantity of repetitions of the instances.

18. The method of claim 1, wherein the first portion of the time window for the communicating of the random access response is preceded by a second portion of the time window for communicating the random access response, the second portion of the time window configured for providing an instance of at least the portion of the random access response without repetition.

19. The method of claim 18, further comprising:
receiving, from the access network entity, an indication of the first portion of the time window and the second portion of the time window via a bit in a bitfield of a remaining system information (RMSI).

20. A method for wireless communication at an access network entity, comprising:

receiving, from a user equipment (UE), a random access request of a random access procedure;
determining, based at least in part on the random access request being a first type of random access request from a plurality of types of random access request, a repetition pattern for a time window for communicating a random access response, the repetition pattern indicating at least a subset of slots of a plurality of slots of the time window, the plurality of slots for repeatedly providing at least a portion of the random access response to the UE; and
transmitting the portion of the random access response in each slot of the subset of slots according to the repetition pattern.

21. The method of claim 20, wherein each type of the plurality of types of random access request is associated with a different repetition pattern for transmitting the random access request, and the first type of random access request is for transmitting the random access request with repetition and a second type of random access request of the plurality of types of random access request is for transmitting the random access request without repetition.

22. The method of claim 20, wherein the determining of the repetition pattern comprises:
identifying a mapping between the plurality of types of random access request and a set of repetition patterns for transmitting instances of at least the portion of the random access response in each slot of the subset of slots; and
determining the repetition pattern based at least in part on the mapping indicating that the first type of random access request corresponds to the repetition pattern.

23. The method of claim 22, wherein the mapping indicates a correspondence between receiving the random access request with repetition and transmitting the instances of at least the portion of the random access response with repetition.

24. The method of claim 22, further comprising:
transmitting, to the UE, an indication of the mapping in one or more of a master information block (MIB) or a remaining minimum system information (RMSI), or a combination thereof.

25. The method of claim 20, wherein each type of the plurality of types of random access request is a different one of a plurality of formats of the random access request, and the first type of random access request is a first format of the plurality of formats.

26. The method of claim 25, wherein the plurality of formats of the random access request comprise a plurality of different preambles.

27. The method of claim 20, wherein each type of the plurality of types of random access request is associated with a different set of resources of a plurality of sets of resources.

28. The method of claim 20, wherein the transmitting of the portion of the random access response in each slot of the subset of slots according to the repetition pattern further comprises:
transmitting the portion of the random access response in at least the subset of slots according to the repetition pattern in a first portion of the time window for communicating the random access response.

29. An apparatus for wireless communication at a user equipment (UE), comprising:
a processor,
memory coupled with the processor; and instructions stored in the memory and executable by the processor to cause the apparatus to:
- select, based at least in part on a quality of a channel between the UE and an access network entity, a first type of random access request from a plurality of types of random access request for a random access procedure;
- transmit, to the access network entity, a random access request of the first type of random access request based at least in part on the selecting of the first type of random access request;
- identify, in a first portion of a time window for communicating a random access response and based at least in part on the selecting of the first type of random access request, a plurality of slots, each configured to provide a different one of instances of at least a portion of the random access response; and
- receive the instances of at least the portion of the random access response in the plurality of slots.

30. An apparatus for wireless communication at an access network entity, comprising:
- a processor,
- memory coupled with the processor; and
- instructions stored in the memory and executable by the processor to cause the apparatus to:
  - receive, from a user equipment (UE), a random access request of a random access procedure;
  - determine, based at least in part on the random access request being a first type of random access request from a plurality of types of random access request, a repetition pattern for a time window for communicating a random access response, the repetition pattern indicating at least a subset of slots of a plurality of slots of the time window, the plurality of slots for repeatedly providing at least a portion of the random access response to the UE; and
  - transmit the portion of the random access response in each slot of the subset of slots according to the repetition pattern.

* * * * *